(12) United States Patent
Mori

(10) Patent No.: US 11,658,794 B2
(45) Date of Patent: May 23, 2023

(54) RADIO FREQUENCY MODULE AND COMMUNICATION DEVICE

(71) Applicant: MURATA MANUFACTURING CO., LTD., Kyoto (JP)

(72) Inventor: Hirotsugu Mori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 16 days.

(21) Appl. No.: 17/308,190

(22) Filed: May 5, 2021

(65) Prior Publication Data

US 2021/0351903 A1 Nov. 11, 2021

(30) Foreign Application Priority Data

May 11, 2020 (JP) .............................. JP2020-083277

(51) Int. Cl.
*H04L 5/14* (2006.01)
*H04L 5/26* (2006.01)
*H04L 5/00* (2006.01)

(52) U.S. Cl.
CPC .......... *H04L 5/1469* (2013.01); *H04L 5/0005* (2013.01); *H04L 5/26* (2013.01)

(58) Field of Classification Search
CPC ....... H04L 5/1469; H04L 5/0005; H04L 5/26; H04B 1/0057; H04B 1/0064; H04B 1/40
See application file for complete search history.

(56) References Cited

U.S. PATENT DOCUMENTS

| 6,130,897 A * | 10/2000 | Ishida | H04B 1/406 |
| | | | 370/280 |
| 6,212,172 B1* | 4/2001 | Barabash | H04B 1/56 |
| | | | 455/76 |
| 7,948,924 B2* | 5/2011 | Seo | H04B 1/48 |
| | | | 370/294 |
| 2013/0315117 A1* | 11/2013 | Le Naour | H04B 7/0413 |
| | | | 370/329 |
| 2014/0024329 A1* | 1/2014 | Khlat | H04B 1/0057 |
| | | | 455/307 |

(Continued)

FOREIGN PATENT DOCUMENTS

| CN | 106100643 A | 11/2016 |
| JP | 2006-128881 A | 5/2006 |

*Primary Examiner* — Atique Ahmed
(74) *Attorney, Agent, or Firm* — Pearne & Gordon LLP

(57) ABSTRACT

A radio frequency module includes: a first antenna connection terminal; a second antenna connection terminal different from the first antenna connection terminal; a first filter having a passband of a first frequency range including a first communication band allocated as a TDD communication band; a second filter having a passband of a second frequency range including a second communication band allocated as a TDD communication band; and a third filter having a passband of a third frequency range including a third communication band allocated as a TDD communication band. The third frequency range is located between the first frequency range and the second frequency range. The first and second filters are both connected to one of the first antenna connection terminal and the second antenna connection terminal. The third filter is connected to the other of the first antenna connection terminal and the second antenna connection terminal.

17 Claims, 14 Drawing Sheets

(56) References Cited

U.S. PATENT DOCUMENTS

| | | | |
|---|---|---|---|
| 2016/0036400 A1* | 2/2016 | Kan | H03F 3/195 |
| | | | 330/252 |
| 2016/0315653 A1 | 10/2016 | Saji et al. | |
| 2017/0012651 A1* | 1/2017 | Ellä | H04L 5/1461 |
| 2018/0123549 A1* | 5/2018 | Takeuchi | H03H 7/38 |
| 2020/0287284 A1* | 9/2020 | Jang | H01Q 11/10 |
| 2021/0258868 A1* | 8/2021 | Wong | H04W 4/029 |

* cited by examiner

RADIO FREQUENCY MODULE AND COMMUNICATION DEVICE

CROSS REFERENCE TO RELATED APPLICATION

The present application is based on and claims priority to Japanese Patent Application No. 2020-083277 filed on May 11, 2020. The entire disclosure of the above-identified application, including the specification, drawings and claims is incorporated herein by reference in its entirety.

TECHNICAL FIELD

The present disclosure relates to radio frequency modules and communication devices.

BACKGROUND

To enable faster and higher-capacity communications, recent communications services have been working towards broadening communication bandwidth and making a simultaneous use of communication bands.

Japanese Unexamined Patent Application Publication No. 2006-128881 discloses a multiplexer capable of duplexing and multiplexing radio frequency signals in two different communication bands. Such multiplexer includes an LC filter including an inductor and a capacitor, and is capable of duplexing and multiplexing radio frequency signals in broad communication bands.

BRIEF SUMMARY

The Third Generation Partnership Project (3G PP) specifies the transfer of a single radio frequency signal independently (herein after also referred to as independent transfer) and the transfer of a plurality of radio frequency signals simultaneously (hereinafter also referred to as simultaneous transfer) in broad communication bands of the Fifth Generation-New Radio (5G-NR), such as n77, n78, and n79, used for Time Division Duplex (TDD).

However, as recognized by the present inventor, in transferring radio frequency signals in these broad communication bands for TDD, the conventional technology fails to provide isolation between a signal path through which a radio frequency signal in such a broad TDD communication band is transferred and a signal path through which a radio frequency signal in an adjacent communication band is transferred. This results in an increase in transfer loss.

The present disclosure has been conceived in view of the foregoing problem, and its aim is to provide a radio frequency module and a communication device that enable low-loss transfer of signals in TDD communication bands.

To achieve the above object, the radio frequency module according to an aspect of the present disclosure includes: a first antenna connection terminal; a second antenna connection terminal different from the first antenna connection terminal; a first filter having a passband which is a first frequency range that includes a first communication band allocated as a communication band for Time Division Duplex (TDD); a second filter having a passband which is a second frequency range that includes a second communication band allocated as a communication band for TDD; and a third filter having a passband which is a third frequency range that includes a third communication band allocated as a communication band for TDD. In the radio frequency module, at least part of the third frequency range is located between the first frequency range and the second frequency range, and the first filter and the second filter are both connected to one of the first antenna connection terminal and the second antenna connection terminal, and the third filter is connected to a remaining one of the first antenna connection terminal and the second antenna connection terminal.

The present disclosure provides radio frequency modules and communication devices that enable the low-loss transfer of signals in TDD communication bands.

BRIEF DESCRIPTION OF DRAWINGS

These and other advantages and features will become apparent from the following descriptions thereof taken in conjunction with the accompanying Drawings, by way of non-limiting examples of embodiments disclosed herein.

DETAILED DESCRIPTION OF EMBODIMENTS

Figure 1:
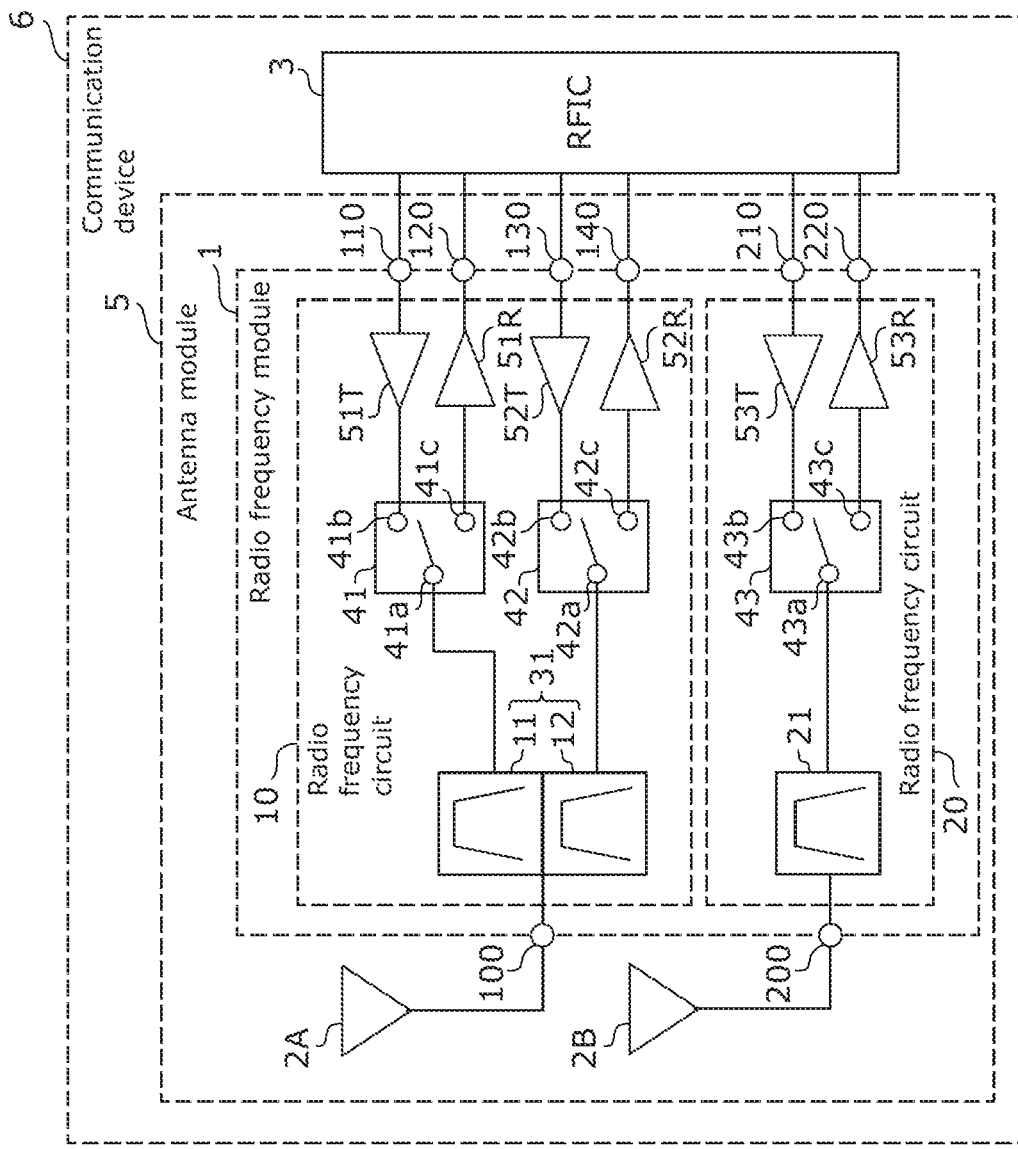
FIG. 1 is a diagram showing the circuit configurations of a radio frequency module and a communication device according to Embodiment 1.

The following describes in detail the embodiments according to the present disclosure with reference to the drawings. Note that the following embodiments and variations thereof show a comprehensive or specific example of the present disclosure. The numerical values, shapes, materials, structural elements, the arrangement and connection of the structural elements, etc. shown in the following embodiments and variations are mere examples, and thus are not intended to limit the present disclosure. Of the structural elements described in the following embodiments and variations, structural elements not recited in any one of the independent claims are described as optional structural elements. Also, the size of the structural elements and the size ratio thereof shown in the drawings are not necessarily exact.

In the following description, "signal path" means a transmission line including a filter that passes a radio frequency signal, wiring through which such radio frequency signal propagates, an electrode directly connected to the wiring, a terminal directly connected to the wiring or the electrode, and so forth.

Embodiment 1

1.1 Configurations of Radio Frequency Module 1 and Communication Device 6

FIG. 1 is a diagram showing the circuit configurations of radio frequency module 1 and communication device 6 according to Embodiment 1. As shown in FIG. 1, communication device 6 includes radio frequency module 1, antennas 2A and 2B, and radio frequency (RF) signal processing circuit (RFIC) 3.

RFIC 3 is an exemplary RF signal processing circuit that processes radio frequency signals that are to be transmitted or have been received by antennas 2A and 2B. More specifically, RFIC 3 performs signal processing, such as down-conversion, on a reception signal input via radio frequency module 1, and outputs the resulting reception signal to a baseband signal processing circuit (BBIC: not illustrated). Also, RFIC 3 outputs, to radio frequency module 1, a transmission signal that has been processed on the basis of a signal input from the BBIC.

Antenna 2A is connected to radio frequency circuit 10 of radio frequency module 1. Antenna 2A transmits a radio frequency signal output from radio frequency circuit 10. Antenna 2A also receives a radio frequency signal from outside, and outputs the received radio frequency signal to radio frequency circuit 10. Antenna 2B is connected to radio frequency circuit 20 of radio frequency module 1. Antenna 2B transmits a radio frequency signal output from radio frequency circuit 20. Antenna 2B also receives a radio frequency signal from outside, and outputs the received radio frequency signal to radio frequency circuit 20.

Note that radio frequency circuits 10 and 20 may not be directly connected to antennas 2A and 2B, respectively; a switch, an impedance matching circuit, a circulator, and a distributor, for example, may be interposed between antenna 2A and radio frequency circuit 10, and between antenna 2B and radio frequency circuit 20.

Antenna module 5 includes antennas 2A and 2B, and radio frequency module 1.

Radio frequency module 1 includes antenna connection terminals 100 and 200, and radio frequency circuits 10 and 20. As shown in FIG. 1, radio frequency circuit 10 includes filters 11 and 12, power amplifiers 51T and 52T, low-noise amplifiers 51R and 52R, and switches 41 and 42. Radio frequency circuit 20 includes filter 21, power amplifier 53T, low-noise amplifier 53R, and switch 43.

Antenna connection terminal 100, which is an example of the first antenna connection terminal, is connected to radio frequency circuit 10. Antenna connection terminal 200, which is an example of the second antenna connection terminal that is different from the first antenna connection terminal, is connected to radio frequency circuit 20.

Filter 11, which is an example of the first filter, is connected to antenna connection terminal 100. Filter 11 is a radio frequency filter having a passband which is a first frequency range that includes a first communication band allocated as a TDD communication band.

Filter 12, which is an example of the second filter, is connected to antenna connection terminal 100. Filter 12 is a radio frequency filter having a passband which is a second frequency range that includes a second communication band allocated as a TDD communication band.

Filter 21, which is an example of the third filter, is connected to antenna connection terminal 200. Filter 21 is a radio frequency filter having a passband which is a third frequency range that includes a third communication band allocated as a TDD communication band.

Radio frequency module 1 and antenna module 5 with the above configurations enable: (1) an independent transfer of a signal in the first communication band; (2) an independent transfer of a signal in the second communication band; (3) an independent transfer of a signal in the third communication band; (4) a simultaneous transfer of a signal in the first communication band and a signal in the second communication band; (5) a simultaneous transfer of a signal in the first communication band and a signal in the third communication band; (6) a simultaneous transfer of a signal in the second communication band and a signal in the third communication band; and (7) a simultaneous transfer of a signal in the first communication band, a signal in the second communication band, and a signal in the third communication band.

Figure 2:
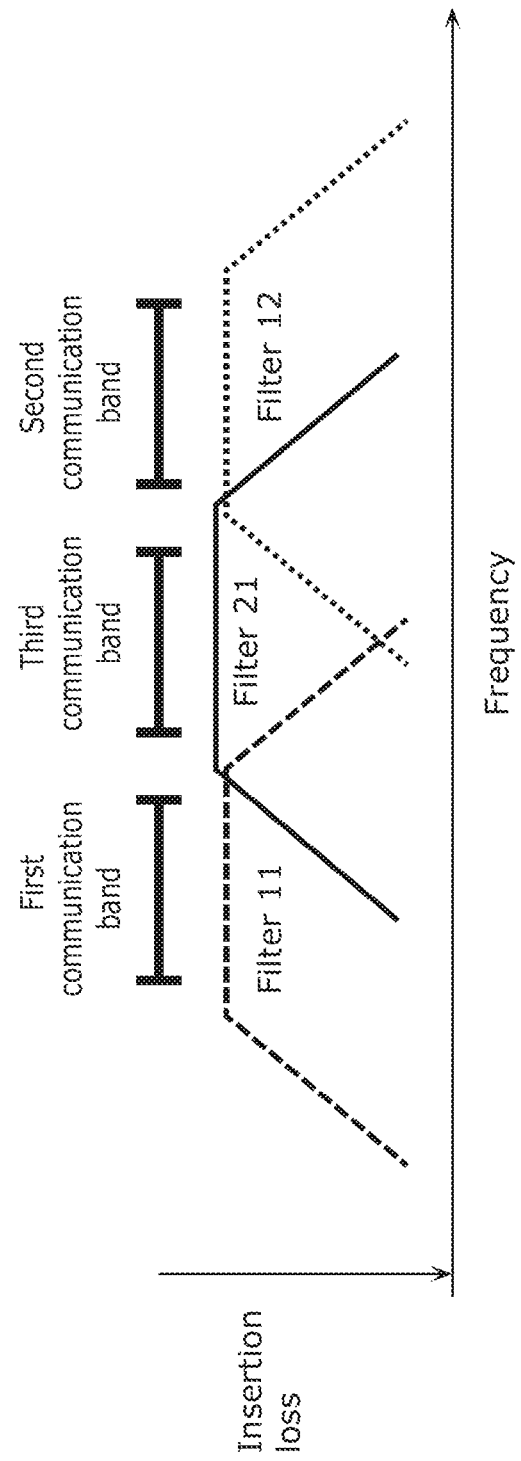
FIG. 2 is a diagram showing a relationship of the frequencies of the passbands of filters included in the radio frequency module according to Embodiment 1.

FIG. 2 is a diagram showing a relationship of the frequencies of the passbands of the filters included in radio frequency module 1 according to Embodiment 1. The drawing shows the relationship of the frequencies of the first communication band, second communication band, and third communication band allocated as TDD communication bands, and filters 11, 12, and 21. In the present embodiment, the first communication band, third communication band, and second communication band are located in the stated order from the lower frequency side. Accordingly, the first frequency range that includes the first communication band, the third frequency range that includes the third communication band, and the second frequency range that includes the second communication band are located in the stated order from the lower frequency side. Stated differently, the third frequency range is located between the first frequency range and the second frequency range. Note that the third frequency range may overlap the first frequency range and the second frequency range; at least part of the third frequency range is simply required to be located between the first frequency range and the second frequency range. Accordingly, at least part of the passband of filter 21 is located between the passband of filter 11 and the passband of filter 12.

Note that the first communication band, third communication band, and second communication band may be located in the stated order from the higher frequency side. Accordingly, the first frequency range that includes the first communication band, the third frequency range that includes the third communication band, and the second frequency range that includes the second communication band may be located in the stated order from the higher frequency side.

As shown in FIG. 1, one end of filter 11 and one end of filter 12 are both connected to antenna connection terminal 100, and one end of filter 21 is connected to antenna connection terminal 200. Filters 11 and 12 are included in multiplexer 31.

Here, the frequency spacing between the first frequency range (first communication band) and the third frequency range (third communication band) is smaller than the frequency spacing between the first frequency range (first communication band) and the second frequency range (second communication band). Also, the frequency spacing between the second frequency range (second communication band) and the third frequency range (third communication band) is smaller than the frequency spacing between the first frequency range (first communication band) and the second frequency range (second communication band). As such, due to a small frequency spacing between communication bands, the isolation between two signals to be simultaneously transferred can decrease and consequently transfer loss can increase in, for example, simultaneous transfer of a signal in the first communication band and a signal in the third communication band or simultaneous transfer of a signal in the second communication band and a signal in the third communication band. Also, in the independent transfer of a signal in the first communication band, the signal in the first communication band can leak into a signal path through which a signal in the third communication band is transferred. Also, in the independent transfer of a signal in the second communication band, the signal in the second communication band can leak into the signal path through which a signal in the third communication band is transferred. In the independent transfer of a signal in the third communication band, the signal in the third communication band can leak into a signal path through which a signal in the first communication band is transferred and a signal path through which a signal in the second communication band is transferred. Furthermore, in the simultaneous transfer of a signal in the first communication band and a signal in the second communication band, the signal in the first communication band and the signal in the second communication band can leak into the signal path through which a signal in the third communication band is transferred.

In view of the foregoing concerns, in radio frequency module 1 according to the present embodiment, filters 11 and 12 are connected to antenna connection terminal 100, and filter 21 is connected to antenna connection terminal 200. Stated differently, this configuration, in which filter 11 and filter 21 are connected to different antennas, achieves high isolation between a signal in the first communication band that passes through filter 11 and a signal in the third communication band that passes through filter 21. Also, this configuration, in which filter 12 and filter 21 are connected to different antennas, achieves high isolation between a signal in the second communication band that passes through filter 12 and a signal in the third communication band that passes through filter 21.

The foregoing configuration achieves high isolation between two signals to be simultaneously transferred, that is, a signal in the first communication band and a signal in the third communication band or a signal in the second communication band and a signal in the third communication band. This configuration thus enables low-loss signal transfer. The foregoing configuration also achieves high isolation between the signal path through which a signal in the first communication band is transferred and the signal path through which a signal in the third communication band is transferred in the independent transfer of a signal in the first communication band, thus enabling low-loss signal transfer. The foregoing configuration also achieves high isolation between the signal path through which a signal in the second communication band is transferred and the signal path through which a signal in the third communication band is transferred in the independent transfer of a signal in the second communication band, thus enabling low-loss signal transfer. The foregoing configuration also achieves high isolation between the signal path through which a signal in the third communication band is transferred and the signal paths through which signals in the first communication band and the second communication band are transferred in the independent transfer of a signal in the third communication band, thus enabling low-loss signal transfer. The foregoing configuration also achieves high isolation between the signal paths through which signals in the first communication band and the second communication band are transferred and the signal path through which a signal in the third communication band is transferred in the simultaneous transfer of a signal in the first communication band and a signal in the second communication band, thus enabling a low-loss signal transfer.

Further, since the frequency spacing between broad communication bands for TDD has been conventionally small, variations in the signal phase at an end of the passband increase as a result of an attempt to achieve isolation between the adjacent TDD communication bands, when the antennation slope is required to be steep in the proximity of the passband. This results in an increase in amplification variations caused by a ripple in the passband, leading to the degradation in error vector magnitude (EVM). In particular, TDD communication bands that support NR are involved in a stringent EVM specification, and thus EVM degradation needs to be prevented. Radio frequency module 1 according to the present embodiment is effective also in terms of being capable of preventing EVM degradation.

The following describes circuit components other than the filters included in radio frequency circuits 10 and 20.

Power amplifier 51T is a transmission amplifier that amplifies a transmission signal in the first frequency range that includes the first communication band. The input terminal of power amplifier 51T is connected to transmission input terminal 110. Low-noise amplifier 51R is a reception amplifier that amplifies a reception signal in the first frequency range that includes the first communication band. The output terminal of low-noise amplifier 51R is connected to reception output terminal 120.

Power amplifier 52T is a transmission amplifier that amplifies a transmission signal in the second frequency range that includes the second communication band. The input terminal of power amplifier 52T is connected to transmission input terminal 130. Low-noise amplifier 52R is a reception amplifier that amplifies a reception signal in the second frequency range that includes the second communication band. The output terminal of low-noise amplifier 52R is connected to reception output terminal 140.

Power amplifier 53T is a transmission amplifier that amplifies a transmission signal in the third frequency range that includes the third communication band. The input terminal of power amplifier 53T is connected to transmission input terminal 210. Low-noise amplifier 53R is a reception amplifier that amplifies a reception signal in the third frequency range that includes the third communication band. The output terminal of low-noise amplifier 53R is connected to reception output terminal 220.

Switch 41 includes common terminal 41a, and selection terminals 41b and 41c. Switch 41 exclusively switches between connecting common terminal 41a and selection terminal 41b and connecting common terminal 41a and selection terminal 41c. Common terminal 41a is connected to the other end of filter 11, selection terminal 41b to the output terminal of power amplifier 51T, and selection terminal 41c to the input terminal of low-noise amplifier 51R. Switch 41 performs the switching operation to enable radio frequency circuit 10 to transfer a transmission signal in the first communication band and a reception signal in the first communication band in different time slots.

Switch 42 includes common terminal 42a, and selection terminals 42b and 42c. Switch 42 exclusively switches between connecting common terminal 42a and selection terminal 42b and connecting common terminal 42a and selection terminal 42c. Common terminal 42a is connected to the other end of filter 12, selection terminal 42b to the output terminal of power amplifier 52T, and selection terminal 42c to the input terminal of low-noise amplifier 52R. Switch 42 performs the switching operation to enable radio frequency circuit 10 to transfer a transmission signal in the second communication band and a reception signal in the second communication band in different time slots.

Switch 43 includes common terminal 43a, and selection terminals 43b and 43c. Switch 43 exclusively switches between connecting common terminal 43a and selection terminal 43b and connecting common terminal 43a and selection terminal 43c. Common terminal 43a is connected to the other end of filter 21, selection terminal 43b to the output terminal of power amplifier 53T, and selection terminal 43c to the input terminal of low-noise amplifier 53R. Switch 43 performs the switching operation to enable radio frequency circuit 20 to transfer a transmission signal in the third communication band and a reception signal in the third communication band in different time slots.

1.2 Configuration of Radio Frequency Module According to Variation

The radio frequency module according to the present embodiment may include, between radio frequency circuits 10 and 20 and antennas 2A and 2B, switch 45 that performs a switching operation described below.

Figure 3A:
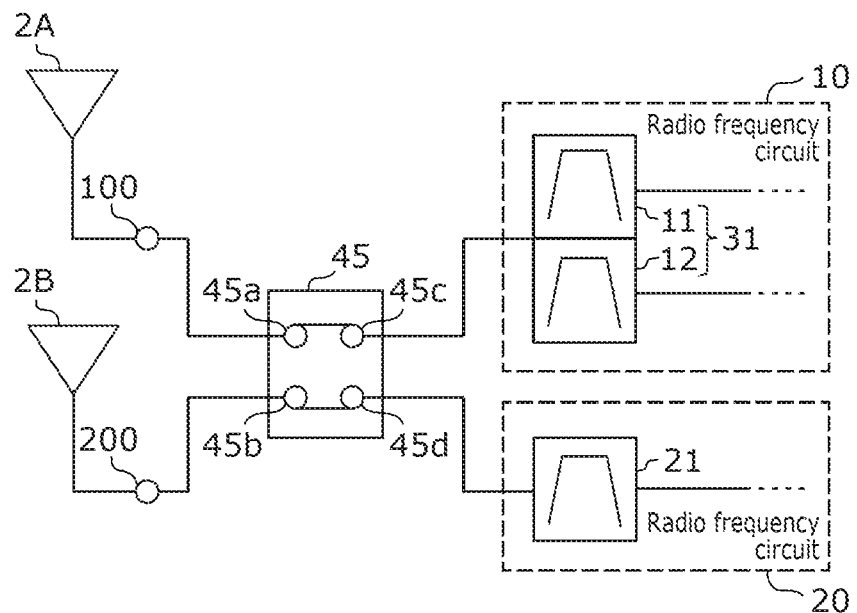
FIG. 3A is a diagram showing the circuit configuration of a radio frequency module according to a variation of Embodiment 1 in a first connection status.
Figure 3B:
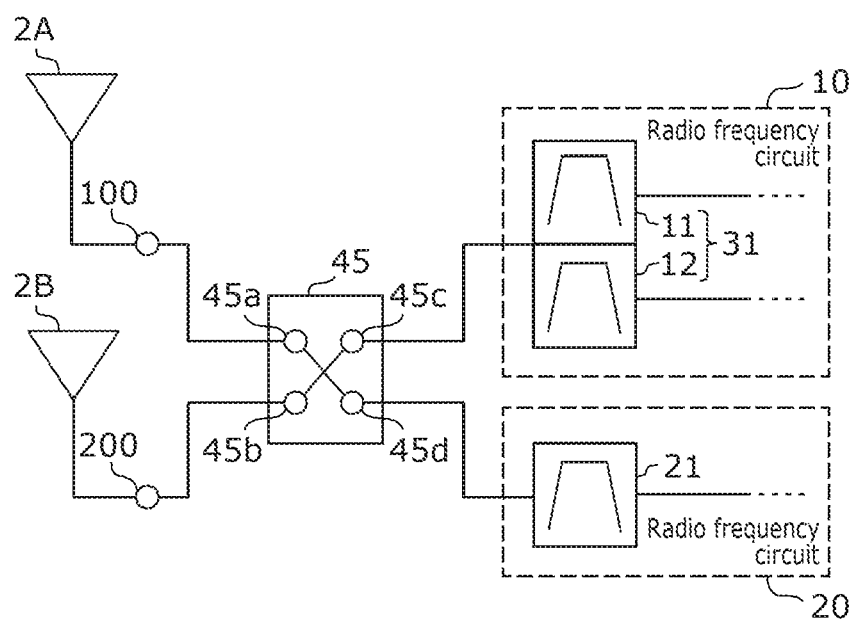
FIG. 3B is a diagram showing the circuit configuration of the radio frequency module according to the variation of Embodiment 1 in a second connection status.

FIG. 3A is a diagram showing the circuit configuration of a radio frequency module according to a variation of Embodiment 1 in a first connection status. FIG. 3B is a diagram showing the circuit configuration of the radio frequency module according to the variation of Embodiment 1 in a second connection status.

As shown in FIG. 3A and FIG. 3B, the radio frequency module according to the present variation further includes switch 45, in addition to the structural elements included in radio frequency module 1 according to Embodiment 1.

Switch 45, which is an exemplary first switch, includes common terminal 45a (first common terminal), common terminal 45b (second common terminal), selection terminal 45c (first selection terminal), and selection terminal 45d (second selection terminal). Switch 45 connects common terminal 45a exclusively to selection terminal 45c or 45d, and connects common terminal 45b exclusively to selection terminal 45c or 45d. Common terminal 45a is connected to antenna connection terminal 100, common terminal 45b to antenna connection terminal 200, selection terminal 45c to one end of filter 11 and one end of filter 12, and selection terminal 45d to one end of filter 21.

With the above configuration, the radio frequency module according to the present variation is in either the first connection status shown in FIG. 3A or the second connection status shown in FIG. 3B. In the first connection status, radio frequency circuit 10 and antenna 2A are connected, and radio frequency circuit 20 and antenna 2B are connected. In the second connection status, radio frequency circuit 10 and antenna 2B are connected, and radio frequency circuit 20 and antenna 2A are connected.

Stated differently, in the radio frequency module according to the present variation, filters 11 and 12 are both connected to one of antenna connection terminals 100 and 200 via selection terminal 45c, and filter 21 is connected to the remaining one of antenna connection terminals 100 and 200 via selection terminal 45d.

In the radio frequency module according to the present variation, filters 11 and 12 are connected to one of antenna connection terminals 100 and 200, and filter 21 is connected to the remaining one of antenna connection terminals 100 and 200. This configuration, in which filter 11 and filter 21 are connected to different antennas, achieves high isolation between a signal in the first communication band that passes through filter 11 and a signal in the third communication band that passes through filter 21. Also, this configuration, in which filter 12 and filter 21 are connected to different antennas, achieves high isolation between a signal in the second communication band that passes through filter 12 and a signal in the third communication band that passes through filter 21.

In radio frequency module 1 according to Embodiment 1, antenna module 5 may be an antenna module that transfers radio frequency signals in a millimeter-wave frequency range. For example, the first frequency range may include 24.25 GHz to 27.50 GHz, the second frequency range may include one of 37.00 GHz to 40.00 GHz and 39.50 GHz to 43.50 GHz, and the third frequency range may include one of 26.50 GHz to 29.50 GHz and 27.50 GHz to 28.35 GHz. In this case, for example, n258 (24.25 GHz to 27.50 GHz) of 5G-NR is applied to the first communication band, n260 (37.00 GHz to 40.00 GHz) or n259 (39.50 GHz to 43.50 GHz) of 5G-NR is applied to the second communication band, and n257 (26.50 GHz to 29.50 GHz) or n261 (27.50 GHz to 28.35 GHz) of 5G-NR is applied to the third communication band.

Figure 3C:
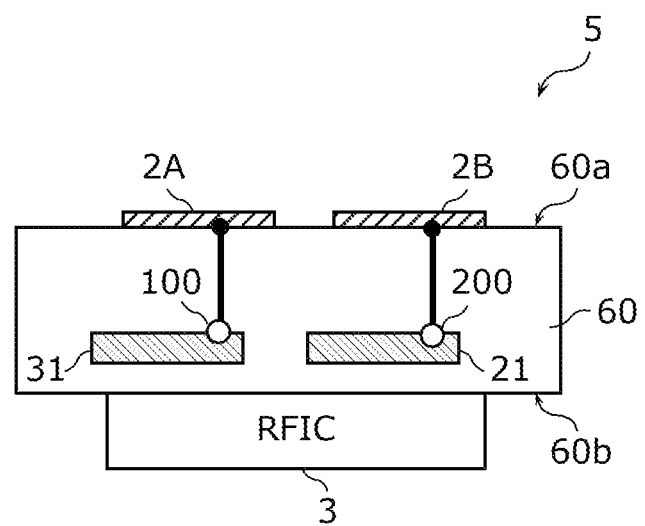
FIG. 3C is a schematic cross-sectional view of an exemplary configuration of an antenna module according to Embodiment 1.

FIG. 3C is a schematic cross-sectional view of an exemplary configuration of antenna module 5 according to Embodiment 1. In the case where antenna module 5 is an antenna module that transfers radio frequency signals in a millimeter-wave frequency range, antennas 2A and 2B, filter 21 and multiplexer 31, and RFIC 3 are disposed on module board 60 as shown in FIG. 3C.

Antennas 2A and 2B are, for example, planar antennas or linear antennas disposed on principal surface 60a of module board 60. In a plan view of module board 60, antennas 2A and 2B do not overlap.

Filter 21 and multiplexer 31 may each be implemented as, for example, a distributed-constant filter. Here, a distributed-constant filter is a filter that includes at least one of a half-wave line or a quarter-wave line.

Note that antennas 2A and 2B may not be disposed on the same module board 60 on which filter 21 and multiplexer 31 are disposed, and thus may be disposed on different boards.

Also note that antenna module 5 may include RFIC 3.

Embodiment 2

While the radio frequency module according to Embodiment 1 includes radio frequency circuits 10 and 20 that are connected to different antennas, the radio frequency module according to the present embodiment includes radio frequency circuits 10 and 20 that are connected to the same antenna 2.

2.1 Configuration of Radio Frequency Module 1A

Figure 4:
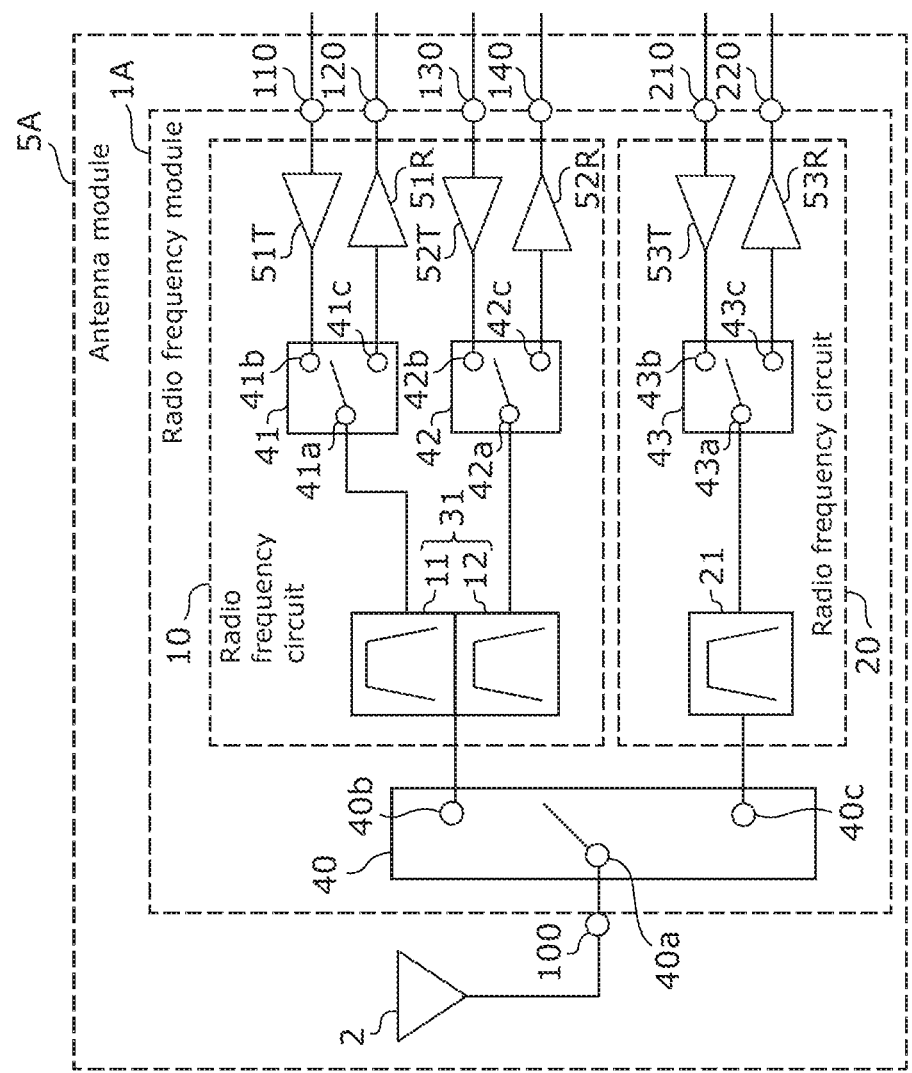
FIG. 4 is a diagram showing the circuit configurations of a radio frequency module and an antenna module according to Embodiment 2.

FIG. 4 is a diagram showing the circuit configurations of radio frequency module 1A and antenna module 5A according to Embodiment 2.

Antenna module 5A includes antenna 2 and radio frequency module 1A. Antenna module 5A according to the present embodiment is different from antenna module 5 according to Embodiment 1 in that a single antenna 2 is disposed and that radio frequency module 1A includes switch 40. The following omits the descriptions of the same points as those of antenna module 5 and radio frequency module 1 according to Embodiment 1 and focuses on the differences to describe antenna module 5A and radio frequency module 1A according to the present embodiment.

Antenna 2 is connected to switch 40 of radio frequency module 1A. Antenna 2 transmits a radio frequency signal output from radio frequency circuit 10 or 20. Antenna 2 also receives a radio frequency signal from outside, and outputs the received radio frequency signal to radio frequency circuit 10 or 20.

Switch 40 may not be directly connected to antenna 2; an impedance matching circuit, a circulator, and a distributor, for example, may be interposed between antenna 2 and switch 40.

As shown in FIG. 4, radio frequency module 1A includes antenna connection terminal 100, radio frequency circuits 10 and 20, and switch 40.

Switch 40 includes common terminal 40a, and selection terminal 40b (first selection terminal) and selection terminal 40c (second selection terminal). Switch 40 exclusively switches between connecting common terminal 40a and selection terminal 40b and connecting common terminal 40a and selection terminal 40c.

As shown in FIG. 4, one end of filter 11 and one end of filter 12 are both connected to selection terminal 40b, and one end of filter 21 is connected to selection terminal 40c. Filters 11 and 12 are included in multiplexer 31.

Radio frequency module 1A and antenna module 5A with the above configurations enable: (1) an independent transfer of a signal in the first communication band; (2) an independent transfer of a signal in the second communication band; (3) an independent transfer of a signal in the third communication band; and (4) a simultaneous transfer of a signal in the first communication band and a signal in the second communication band.

Here, as shown in FIG. 2, the frequency spacing between the first frequency range (first communication band) and the third frequency range (third communication band) is smaller than the frequency spacing between the first frequency range (first communication band) and the second frequency range (second communication band). Also, the frequency spacing between the second frequency range (second communication band) and the third frequency range (third communication band) is smaller than the frequency spacing between the first frequency range (first communication band) and the second frequency range (second communication band). As such, for example, in the independent transfer of a signal in the first communication band, the signal in the first communication band can leak into the signal path through which a signal in the third communication band is transferred. Also, in the independent transfer of a signal in the second communication band, the signal in the second communication band can leak into the signal path through which a signal in the third communication band is transferred. In the independent transfer of a signal in the third communication band, the signal in the third communication band can leak into the signal paths through which signals in the first communication band and the second communication band are transferred. Furthermore, in the simultaneous transfer of a signal in the first communication band and a signal in the second communication band, the signal in the first communication band and the signal in the second communication band can leak into the signal path through which a signal in the third communication band is transferred.

In view of the foregoing concerns, in radio frequency module 1A according to the present embodiment, filters 11 and 12 are connected to selection terminal 40b of switch 40, and filter 21 is connected to selection terminal 40c of switch 40. Stated differently, in this configuration, filter 11 and filter 21 are not simultaneously connected because of the exclusive connection by switch 40. This configuration thus achieves high isolation between filter 11 and filter 21. Also, in this configuration, filter 12 and filter 21 are not simultaneously connected because of the exclusive connection by switch 40. This configuration thus achieves high isolation between filter 12 and filter 21.

The foregoing configuration thus achieves high isolation between the signal path through which a signal in the first communication band is transferred and the signal path through which a signal in the third communication band is transferred in the independent transfer of a signal in the first communication band, thus enabling a low-loss signal transfer. The foregoing configuration also achieves high isolation between the signal path through which a signal in the second communication band is transferred and the signal path through which a signal in the third communication band is transferred in the independent transfer of a signal in the second communication band, thus enabling low-loss signal transfer. The foregoing configuration also achieves high isolation between the signal path through which a signal in the third communication band is transferred and the signal paths through which signals in the first communication band and the second communication band are transferred in the independent transfer of a signal in the third communication band, thus enabling a low-loss signal transfer. The foregoing configuration also achieves high isolation between the signal paths through which signals in the first communication band and the second communication band are transferred and the signal path through which a signal in the third communication band is transferred in the simultaneous transfer of a signal in the first communication band and a signal in the second communication band, thus enabling a low-loss signal transfer.

In radio frequency module 1 according to Embodiment 1 and radio frequency module 1A according to Embodiment 2, filters 11, 12, and 21 may be disposed on the same board or inside of the same package. Also, radio frequency circuits 10 and 20 may be disposed on the same board or inside of the same package.

This configuration achieves the downsizing of radio frequency modules 1 and 1A.

Alternatively, in radio frequency module 1 according to Embodiment 1 and radio frequency module 1A according to Embodiment 2, filters 11 and 12 may be disposed on a different board or inside of a different package from a board or a package on which or inside of which filter 21 is disposed. Also, radio frequency circuits 10 and 20 may be disposed on different boards or inside of different packages.

This configuration further enhances the isolation between the signal paths of the first communication band and the second communication band and the signal path of the third communication band.

In radio frequency module 1 according to Embodiment 1 and radio frequency module 1A according to Embodiment 2, for example, the first frequency range may include one of 3300 MHz to 4200 MHz and 3300 MHz to 3800 MHz, the second frequency range may include one of 5150 MHz to 5850 MHz and 5150 MHz to 7125 MHz, and the third frequency range may include 4400 MHz to 5000 MHz. In this case, for example, n77 (3300 MHz to 4200 MHz) or n78 (3300 MHz to 3800 MHz) of 5G-NR is applied to the first communication band, Wireless Local Area Network (WLAN: 5.15 GHz to 7.125 GHz band) or New Radio Unlicensed (NR-U) is applied to the second communication band, and n79 (4400 MHz to 5000 MHz) or n78 of 5G-NR is applied to the third communication band.

Note that NR-U, which is a 5G-NR communication band of 5 GHz or greater defined by 3GPP, corresponds to an Unlicensed National Information Infrastructure (U-NII) communication band that is an unlicensed communication band defined by the Federal Communications Commission (FCC). Also, WLAN (5.15 GHz to 7.125 GHz band) is compliant with IEEE 802.11, which is a wireless LAN standard specified by Institute of Electrical and Electronics Engineers.

In radio frequency module 1 according to Embodiment 1 and radio frequency module 1A according to Embodiment 2, for example, the first frequency range may include 1700 MHz to 2700 MHz, the second frequency range may include 4400 MHz to 5000 MHz, and the third frequency range may include 3300 MHz to 4200 MHz. In this case, for example, n40 (2300 MHz to 2400 MHz) or n41 (2496 MHz to 2690 MHz) of 5G-NR is applied to the first communication band, n79 (4400 MHz to 5000 MHz) of 5G-NR is applied to the second communication band, and n77 (3300 MHz to 4200 MHz) or n78 (3300 MHz to 3800 MHz) of 5G-NR is applied to the third communication band.

Also, in radio frequency module 1 according to Embodiment 1 and radio frequency module 1A according to Embodiment 2, for example, the first frequency range may include 1700 MHz to 2700 MHz, the second frequency range may include one of 5150 MHz to 5850 MHz and 5150 MHz to 7125 MHz, and the third frequency range may include 4400 MHz to 5000 MHz. In this case, for example, n40 (2300 MHz to 2400 MHz) or n41 (2496 MHz to 2690 MHz) of 5G-NR is applied to the first communication band, WLAN (5.15 GHz to 7.125 GHz band) or NR-U is applied to the second communication band, and n79 (4400 MHz to 5000 MHz) of 5G-NR is applied to the third communication band.

Embodiment 3

While the radio frequency modules according to Embodiments 1 and 2 have the circuit configuration for transferring signals in the first through third communication bands, the radio frequency module according to the present embodiment has a configuration that further includes a circuit for transferring signals in a fourth communication band.

Figure 5:
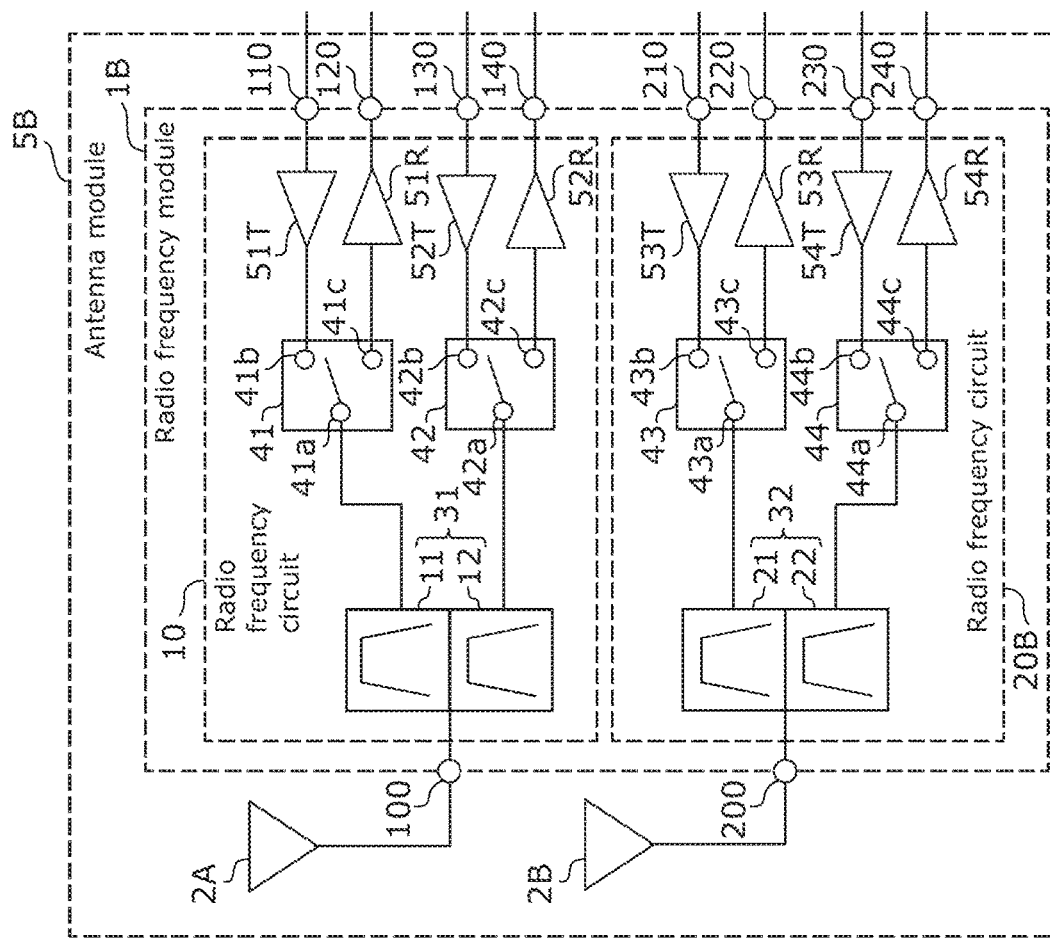
FIG. 5 is a diagram showing the circuit configurations of a radio frequency module and an antenna module according to Embodiment 3.

FIG. 5 is a diagram showing the circuit configurations of radio frequency module 1B and antenna module 5B according to Embodiment 3.

Antenna module 5B includes antennas 2A and 2B, and radio frequency module 1B. Antenna module 5B according to the present embodiment is different from antenna module 5 according to Embodiment 1 in the circuit configuration of radio frequency circuit 20B included in radio frequency module 1B. The following omits the descriptions of the same points as those of antenna module 5 and radio frequency module 1 according to Embodiment 1 and focuses on the difference to describe antenna module 5B and radio frequency module 1B according to the present embodiment.

Note that radio frequency circuits 10 and 20B may not be directly connected to antennas 2A and 2B, respectively; a switch, an impedance matching circuit, a circulator, and a distributor, for example, may be interposed between antenna 2A and radio frequency circuit 10, and between antenna 2B and radio frequency circuit 20B.

Radio frequency module 1B includes antenna connection terminals 100 and 200, and radio frequency circuits 10 and 20B. As shown in FIG. 5, radio frequency circuit 10 includes filters 11 and 12, power amplifiers 51T and 52T, low-noise amplifiers 51R and 52R, and switches 41 and 42. Radio frequency circuit 20B includes filters 21 and 22, power amplifiers 53T and 54T, low-noise amplifiers 53R and 54R, and switches 43 and 44.

Filter 21, which is an exemplary third filter, is connected to antenna connection terminal 200. Filter 21 is a radio frequency filter having a passband which is the third frequency range that includes the third communication band allocated as a TDD communication band.

Filter 22, which is an exemplary fourth filter, is connected to antenna connection terminal 200. Filter 22 is a radio frequency filter having a passband which is a fourth frequency range that includes a fourth communication band allocated as a TDD communication band. Note that the fourth communication band may not be a communication band for TDD, and thus may be, for example, a communication band for Frequency Division Duplex (FDD).

Radio frequency module 1B and antenna module 5B with the above configurations enable: (1) an independent transfer of a signal in the first communication band; (2) an independent transfer of a signal in the second communication band; (3) an independent transfer of a signal in the third communication band; (4) an independent transfer of a signal in the fourth communication band; (5) a simultaneous transfer of a signal in the first communication band and a signal in the second communication band; (6) a simultaneous transfer of a signal in the third communication band and a signal in the fourth communication band; (7) a simultaneous transfer of a signal in the first communication band and a signal in the third communication band; (8) a simultaneous transfer of a signal in the second communication band and a signal in the third communication band; (9) a simultaneous transfer of a signal in the fourth communication band and a signal in the first communication band; (10) a simultaneous transfer of a signal in the fourth communication band and a signal in the second communication band; and (11) a simultaneous transfer of at least three of a signal in the first communication band, a signal in the second communication band, a signal in the third communication band, and a signal in the fourth communication band.

Figure 6:
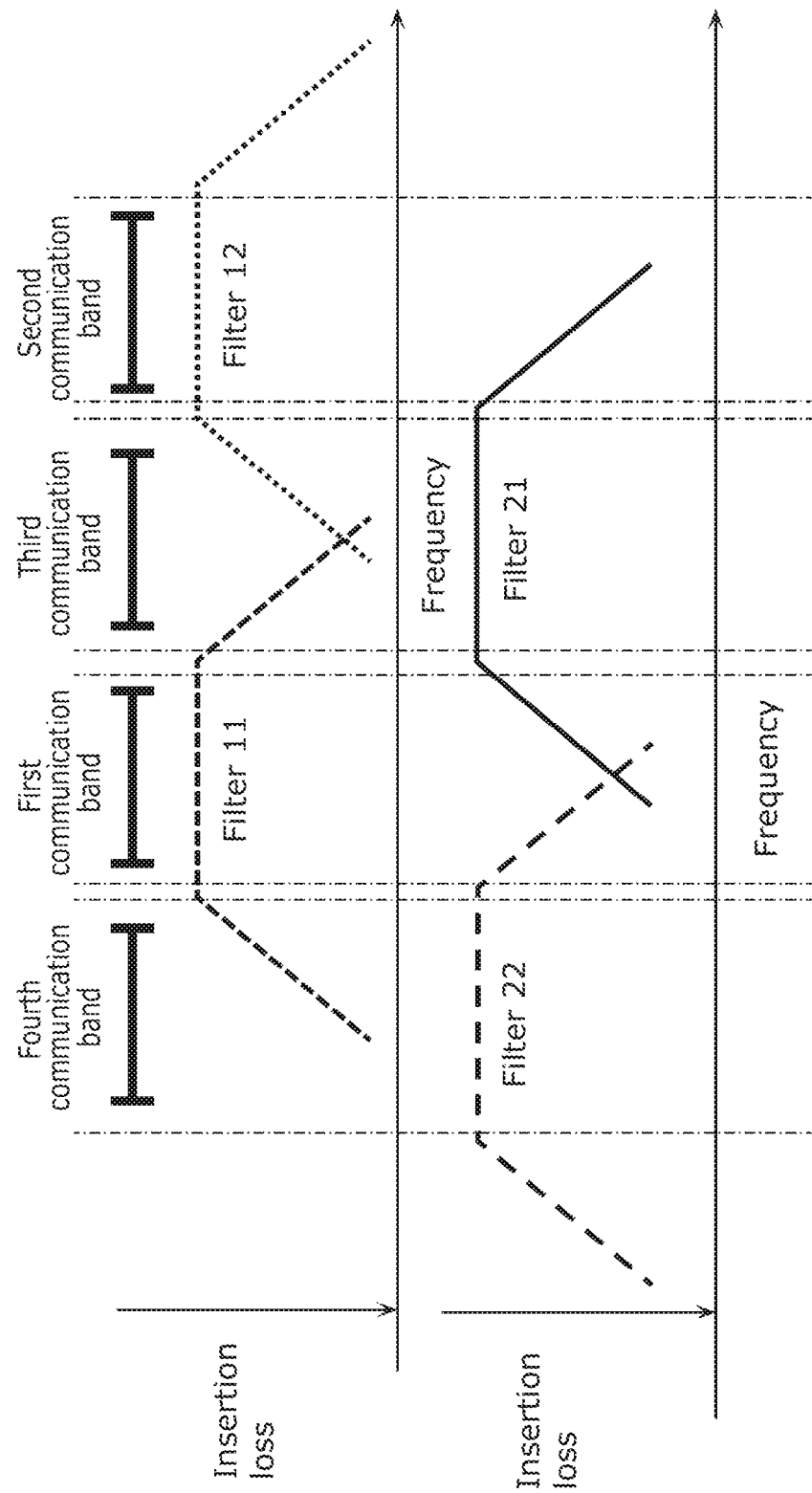
FIG. 6 is a diagram showing a relationship of the frequencies of the passbands of filters included in the radio frequency module according to Embodiment 3.

FIG. 6 is a diagram showing a relationship of the frequencies of the passbands of the filters included in radio frequency module 1B according to Embodiment 3. The drawing shows the relationship of the frequencies of the first communication band, second communication band, third communication band, and fourth communication band, and filters 11, 12, 21, and 22. In the present embodiment, the fourth communication band, first communication band, third communication band, and second communication band are located in the stated order from the lower frequency side.

Accordingly, the fourth frequency range that includes the fourth communication band, the first frequency range that includes the first communication band, the third frequency range that includes the third communication band, and the second frequency range that includes the second communication band are located in the stated order from the lower frequency side. Stated differently, the third frequency range is located between the first frequency range and the second frequency range. Note that the third frequency range may overlap the first frequency range and the second frequency range; at least part of the third frequency range is simply required to be located between the first frequency range and the second frequency range. Also, the fourth frequency range is lower than the first frequency range. Note that the fourth frequency range may overlap the first frequency range. Accordingly, at least part of the passband of filter 21 is located between the passband of filter 11 and the passband of filter 12. Also, the passband of filter 22 is lower than the passband of filter 11.

The fourth communication band, first communication band, third communication band, and second communication band may be located in the stated order from the higher frequency side. Accordingly, the fourth frequency range that includes the fourth communication band, the first frequency range that includes the first communication band, the third frequency range that includes the third communication band, and the second frequency range that includes the second communication band may be located in the stated order from the higher frequency side.

As shown in FIG. 5, one end of filter 11 and one end of filter 12 are both connected to antenna connection terminal 100, and one end of filter 21 and one end of filter 22 are both connected to antenna connection terminal 200. Filters 11 and 12 are included in multiplexer 31, and filters 21 and 22 are included in multiplexer 32.

Here, the frequency spacing between the first frequency range (first communication band) and the third frequency range (third communication band) is smaller than the frequency spacing between the first frequency range (first communication band) and the second frequency range (second communication band). Also, the frequency spacing between the second frequency range (second communication band) and the third frequency range (third communication band) is smaller than the frequency spacing between the first frequency range (first communication band) and the second frequency range (second communication band). As such, due to a small frequency spacing between communication bands, the isolation between two signals to be simultaneously transferred can decrease and consequently transfer loss can increase in, for example, simultaneous transfer of a signal in the first communication band and a signal in the third communication band or simultaneous transfer of a signal in the second communication band and a signal in the third communication band.

Also, the frequency spacing between the fourth frequency range (fourth communication band) and the first frequency range (first communication band) is smaller than the frequency spacing between the fourth frequency range (fourth communication band) and the third frequency range (third communication band). Also, the frequency spacing between the third frequency range (third communication band) and the first frequency range (first communication band) is smaller than the frequency spacing between the fourth frequency range (fourth communication band) and the third frequency range (third communication band). As such, due to a small frequency spacing between communication bands, the isolation between two signals to be simultaneously transferred can decrease and consequently transfer loss can increase in, for example, simultaneous transfer of a signal in the fourth communication band and a signal in the first communication band.

Also, in the independent transfer of a signal in the first communication band, the signal in the first communication band can leak into the signal paths through which signals in the third communication band and the fourth communication band are transferred. Also, in the independent transfer of a signal in the second communication band, the signal in the second communication band can leak into the signal path through which a signal in the third communication band is transferred. In the independent transfer of a signal in the third communication band, the signal in the third communication band can leak into the signal paths through which signals in the first communication band and the second communication band are transferred. In the independent transfer of a signal in the fourth communication band, the signal in the fourth communication band can leak into the signal path through which a signal in the first communication band is transferred. Furthermore, in the simultaneous transfer of a signal in the first communication band and a signal in the second communication band, the signal in the first communication band and the signal in the second communication band can leak into the signal path through which a signal in the third communication band is transferred. Also, in the simultaneous transfer of a signal in the third communication band and a signal in the fourth communication band, the signal in the third communication band and the signal in the fourth communication band can leak into the signal path through which a signal in the first communication band is transferred.

In view of the foregoing concerns, in radio frequency module 1B according to the present embodiment, filters 11 and 12 are connected to antenna connection terminal 100, and filters 21 and 22 are connected to antenna connection terminal 200. Stated differently, this configuration, in which filter 21 and filter 11 are connected to different antennas, achieves high isolation between a signal in the third communication band that passes through filter 21 and a signal in the first communication band that passes through filter 11. Also, this configuration, in which filter 21 and filter 12 are connected to different antennas, achieves high isolation between a signal in the third communication band that passes through filter 21 and a signal in the second communication band that passes through filter 12. Also, this configuration, in which filter 22 and filter 11 are connected to different antennas, achieves high isolation between a signal in the fourth communication band that passes through filter 22 and a signal in the first communication band that passes through filter 11. Also, this configuration, in which filter 22 and filter 12 are connected to different antennas, achieves high isolation between a signal in the fourth communication band that passes through filter 22 and a signal in the second communication band that passes through filter 12.

The foregoing configuration thus achieves high isolation between two signals to be simultaneously transferred, that is: a signal in the first communication band and a signal in the third communication band; a signal in the first communication band and a signal in the fourth communication band; a signal in the second communication band and a signal in the third communication band; or a signal in the second communication band and a signal in the fourth communication band. This configuration thus enables a low-loss signal transfer. The foregoing configuration also achieves high isolation between the signal path through which a signal in the first communication band is transferred and the signal paths through which signals in the third communication band and the fourth communication band are transferred in the independent transfer of a signal in the first communication band, thus enabling a low-loss signal transfer. The foregoing configuration also achieves high isolation between the signal path through which a signal in the second communication band is transferred and the signal path through which a signal in the third communication band is transferred in the independent transfer of a signal in the second communication band, thus enabling a low-loss signal transfer. The foregoing configuration also achieves high isolation between the signal path through which a signal in the third communication band is transferred and the signal paths through which signals in the first communication band and the second communication band are transferred in the independent transfer of a signal in the third communication band, thus enabling a low-loss signal transfer. The foregoing configuration also achieves high isolation between the signal path through which a signal in the first communication band is transferred and the signal path through which a signal in the fourth communication band is transferred in the independent transfer of a signal in the fourth communication band, thus enabling a low-loss signal transfer. The foregoing configuration also achieves high isolation between the signal paths through which signals in the first communication band and the second communication band are transferred and the signal paths through which signals in the third communication band and the fourth communication band are transferred in the simultaneous transfer of a signal in the first communication band and a signal in the second communication band or simultaneous transfer of a signal in the third communication band and a signal in the fourth communication band, thus enabling a low-loss signal transfer.

Power amplifier 54T is a transmission amplifier that amplifies a transmission signal in the fourth frequency range that includes the fourth communication band. The input terminal of power amplifier 54T is connected to transmission input terminal 230. Low-noise amplifier 54R is a reception amplifier that amplifies a reception signal in the fourth frequency range that includes the fourth communication band. The output terminal of low-noise amplifier 54R is connected to reception output terminal 240.

Switch 44 includes common terminal 44a, and selection terminals 44b and 44c. Switch 44 exclusively switches between connecting common terminal 44a and selection terminal 44b and connecting common terminal 44a and selection terminal 44c. Common terminal 44a is connected to the other end of filter 22, selection terminal 44b to the output terminal of power amplifier 54T, and selection terminal 44c to the input terminal of low-noise amplifier 54R. Switch 44 performs the switching operation to enable radio frequency circuit 20B to transfer a transmission signal in the fourth communication band and a reception signal in the fourth communication band in different time slots.

3.1 Configuration of Radio Frequency Module According to Variation

The radio frequency module according to the present embodiment may include, between radio frequency circuits 10 and 20B and antennas 2A and 2B, switch 46 that performs a switching operation described below.

Figure 7A:
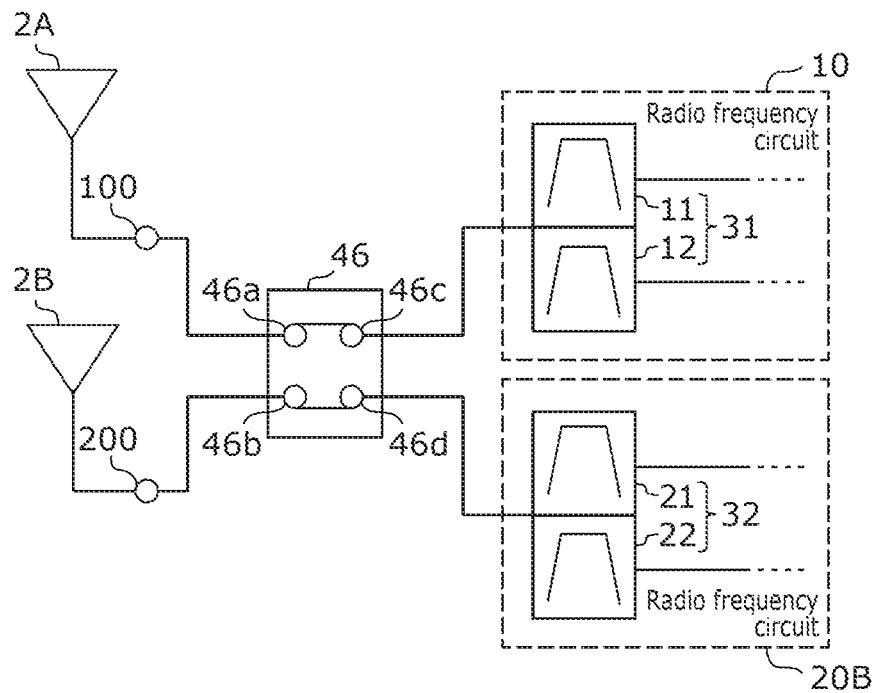
FIG. 7A is a diagram showing the circuit configuration of a radio frequency module according to a variation of Embodiment 3 in a first connection status.
Figure 7B:
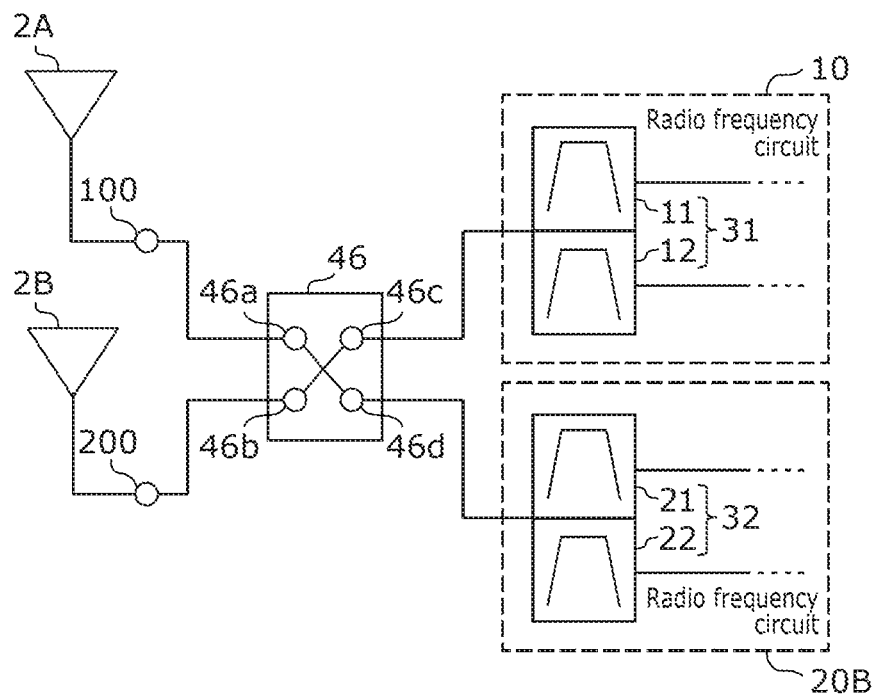
FIG. 7B is a diagram showing the circuit configuration of the radio frequency module according to the variation of Embodiment 3 in a second connection status.

FIG. 7A is a diagram showing the circuit configuration of a radio frequency module according to a variation of Embodiment 3 in a first connection status. FIG. 7B is a diagram showing the circuit configuration of the radio frequency module according to the variation of Embodiment 3 in a second connection status.

As shown in FIG. 7A and FIG. 7B, the radio frequency module according to the present variation further includes switch 46, in addition to the structural elements included in radio frequency module 1B according to Embodiment 3.

Switch 46, which is an example of the first switch, includes common terminal 46a (first common terminal), common terminal 46b (second common terminal), selection terminal 46c (first selection terminal), and selection terminal 46d (second selection terminal). Switch 46 connects common terminal 46a exclusively to selection terminal 46c or 46d, and connects common terminal 46b exclusively to selection terminal 46c or 46d. Common terminal 46a is connected to antenna connection terminal 100, common terminal 46b to antenna connection terminal 200, selection terminal 46c to one end of filter 11 and one end of filter 12, and selection terminal 46d to one end of filter 21 and one end of filter 22.

With the above configuration, the radio frequency module according to the present variation is either in the first connection status shown in FIG. 7A or the second connection status shown in FIG. 7B. In the first connection status, radio frequency circuit 10 and antenna 2A are connected, and radio frequency circuit 20B and antenna 2B are connected. In the second connection status, radio frequency circuit 10 and antenna 2B are connected, and radio frequency circuit 20B and antenna 2A are connected.

Stated differently, in the radio frequency module according to the present variation, filters 11 and 12 are both connected to one of antenna connection terminals 100 and 200 via selection terminal 46c, and filters 21 and 22 are connected to the remaining one of antenna connection terminals 100 and 200 via selection terminal 46d.

In the radio frequency module according to the present variation, filters 11 and 12 are connected to one of antenna connection terminals 100 and 200, and filters 21 and 22 are connected to the remaining one of antenna connection terminals 100 and 200. This configuration, in which filter 21 and filter 11 are connected to different antennas, achieves high isolation between a signal in the third communication band that passes through filter 21 and a signal in the first communication band that passes through filter 11. Also, this configuration, in which filter 21 and filter 12 are connected to different antennas, achieves high isolation between a signal in the third communication band that passes through filter 21 and a signal in the second communication band that passes through filter 12. Also, this configuration, in which filter 22 and filter 11 are connected to different antennas, achieves high isolation between a signal in the fourth communication band that passes through filter 22 and a signal in the first communication band that passes through filter 11. Also, this configuration, in which filter 22 and filter 12 are connected to different antennas, achieves high isolation between a signal in the fourth communication band that passes through filter 22 and a signal in the second communication band that passes through filter 12.

In radio frequency module 1B according to Embodiment 3, for example, the first frequency range may include one of 26.50 GHz to 29.50 GHz or 27.50 GHz to 28.35 GHz, the second frequency range may include 39.50 GHz to 43.50 GHz, the third frequency range may include 37.00 GHz to 40.00 GHz, and the fourth frequency range may include 24.25 GHz to 27.50 GHz. In this case, for example, n257 (26.50 GHz to 29.50 GHz) or n261 (27.50 GHz to 28.35 GHz) of 5G-NR is applied to the first communication band, n259 (39.50 GHz to 43.50 GHz) of 5G-NR is applied to the second communication band, n260 (37.00 GHz to 40.00 GHz) of 5G-NR is applied to the third communication band, and n258 (24.25 GHz to 27.50 GHz) of 5G-NR is applied to the fourth communication band.

Embodiment 4

While the radio frequency module according to Embodiment 3 includes radio frequency circuits 10 and 20B that are connected to different antennas, the radio frequency module according to the present embodiment includes radio frequency circuits 10 and 20B that are connected to the same antenna.

4.1 Configuration of Radio Frequency Module 1C

Figure 8:
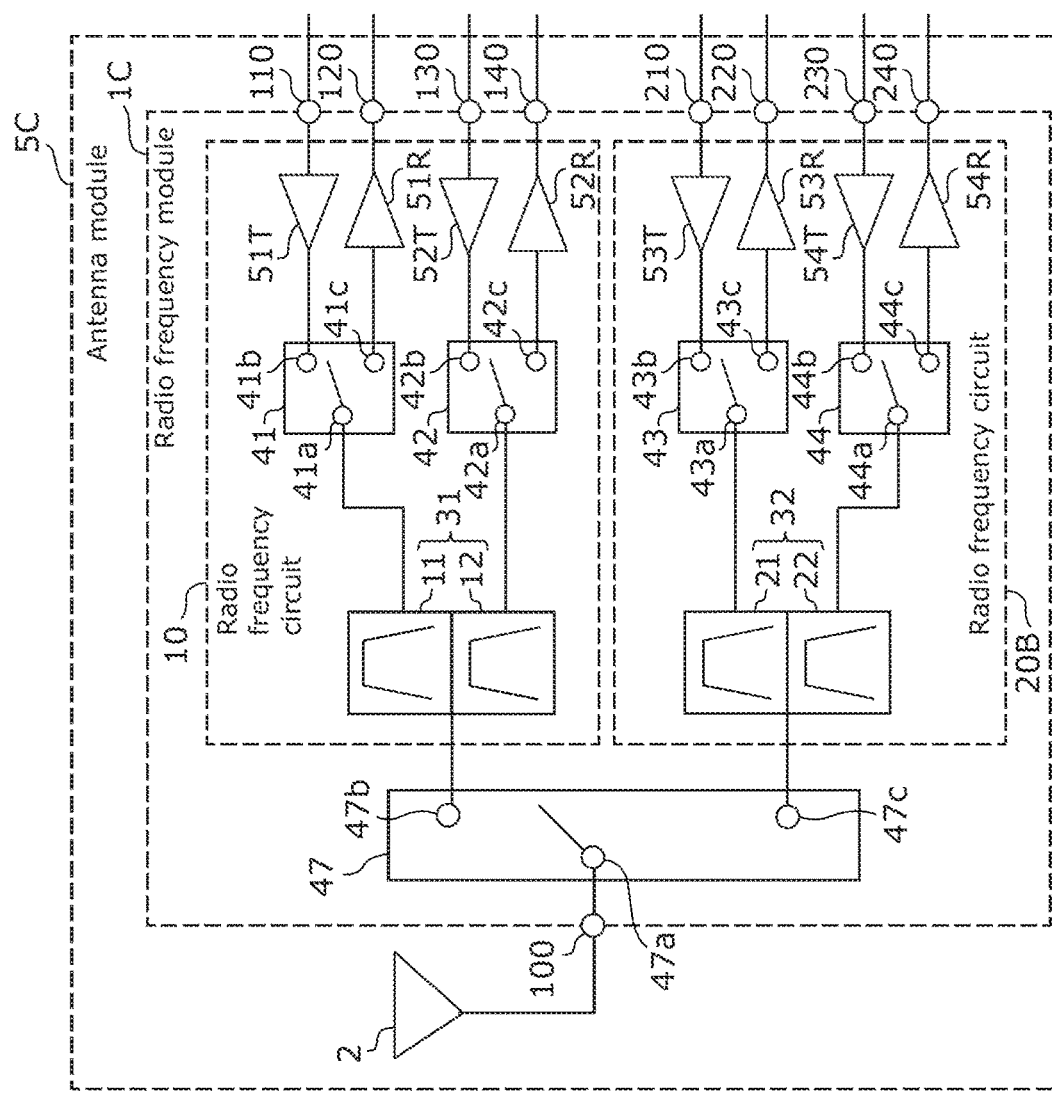
FIG. 8 is a diagram showing the circuit configurations of a radio frequency module and an antenna module according to Embodiment 4.

FIG. 8 is a diagram showing the circuit configurations of radio frequency module 1C and antenna module 5C according to Embodiment 4.

Antenna module 5C includes antenna 2 and radio frequency module 1C. Antenna module 5C according to the present embodiment is different from antenna module 5B according to Embodiment 3 in that a single antenna 2 is disposed and that radio frequency module 1C includes switch 47. The following omits the descriptions of the same points as those of antenna module 5B and radio frequency module 1B according to Embodiment 3 and focuses on the differences to describe antenna module 5C and radio frequency module 1C according to the present embodiment.

Antenna 2 is connected to switch 47 of radio frequency module 1C. Antenna 2 transmits a radio frequency signal output from radio frequency circuit 10 or 20B. Antenna 2 also receives a radio frequency signal from outside, and outputs the received radio frequency signal to radio frequency circuit 10 or 20B.

Note that switch 47 may not be directly connected to antenna 2; an impedance matching circuit, a circulator, and a distributor, for example, may be interposed between antenna 2 and switch 47.

As shown in FIG. 8, radio frequency module 1C includes antenna connection terminal 100, radio frequency circuits 10 and 20B, and switch 47.

Switch 47, which is an example of the first switch, includes common terminal 47a, and selection terminal 47b (first selection terminal) and selection terminal 47c (second selection terminal). Switch 47 exclusively switches between connecting common terminal 47a and selection terminal 47b and connecting common terminal 47a and selection terminal 47c.

As shown in FIG. 8, one end of filter 11 and one end of filter 12 are both connected to selection terminal 47b, and one end of filter 21 and one end of filter 22 are both connected to selection terminal 47c. Filters 11 and 12 are included in multiplexer 31, and filters 21 and 22 are included in multiplexer 32.

Radio frequency module 1C and antenna module 5C with the above configurations enable: (1) an independent transfer of a signal in the first communication band; (2) an independent transfer of a signal in the second communication band; (3) an independent transfer of a signal in the third communication band; (4) an independent transfer of a signal in the fourth communication band; (5) a simultaneous transfer of a signal in the first communication band and a signal in the second communication band; and (6) a simultaneous transfer of a signal in the third communication band and a signal in the fourth communication band.

Here, as shown in FIG. 6, the frequency spacing between the first frequency range (first communication band) and the third frequency range (third communication band) is smaller than the frequency spacing between the first frequency range (first communication band) and the second frequency range (second communication band). Also, the frequency spacing between the second frequency range (second communication band) and the third frequency range (third communication band) is smaller than the frequency spacing between the first frequency range (first communication band) and the second frequency range (second communication band). Also, the frequency spacing between the fourth frequency range (fourth communication band) and the first frequency range (first communication band) is smaller than the frequency spacing between the fourth frequency range (fourth communication band) and the third frequency range (third communication band). Also, the frequency spacing between the third frequency range (third communication band) and the first frequency range (first communication band) is smaller than the frequency spacing between the fourth frequency range (fourth communication band) and the third frequency range (third communication band).

As such, for example, in the independent transfer of a signal in the first communication band, the signal in the first communication band can leak into the signal paths through which signals in the third communication band and the fourth communication band are transferred. Also, in the independent transfer of a signal in the second communication band, the signal in the second communication band can leak into the signal path through which a signal in the third communication band is transferred. Also, in the independent transfer of a signal in the third communication band, the signal in the third communication band can leak into the signal paths through which signals in the first communication band and the second communication band are transferred. In the independent transfer of a signal in the fourth communication band, the signal in the fourth communication band can leak into the signal path through which a signal in the first communication band is transferred. Furthermore, in the simultaneous transfer of a signal in the first communication band and a signal in the second communication band, the signal in the first communication band and the signal in the second communication band can leak into the signal path through which a signal in the third communication band is transferred. Also, in the simultaneous transfer of a signal in the third communication band and a signal in the fourth communication band, the signal in the third communication band and the signal in the fourth communication band can leak into the signal path through which a signal in the first communication band is transferred.

In view of the foregoing concerns, in radio frequency module 1C according to the present embodiment, filters 11 and 12 are connected to selection terminal 47b of switch 47, and filters 21 and 22 are connected to selection terminal 47c of switch 47. Stated differently, in this configuration, filter 11 and filter 21 are not simultaneously connected because of the exclusive connection by switch 47. This configuration thus achieves high isolation between filter 11 and filter 21. Also, in this configuration, filter 12 and filter are not simultaneously connected because of the exclusive connection by switch 47. This configuration thus achieves high isolation between filter 12 and filter 21. Also, in this configuration, filter 11 and filter 22 are not simultaneously connected because of the exclusive connection by switch 47. This configuration thus achieves high isolation between filter 11 and filter 22. Also, in this configuration, filter 12 and filter 22 are not simultaneously connected because of the exclusive connection by switch 47. This configuration thus achieves high isolation between filter 12 and filter 22.

The foregoing configuration thus achieves high isolation between the signal path through which a signal in the first communication band is transferred and the signal path through which a signal in the third communication band is transferred in the independent transfer of a signal in the first communication band, thus enabling low-loss signal transfer. The foregoing configuration also achieves high isolation between the signal path through which a signal in the second communication band is transferred and the signal path through which a signal in the third communication band is transferred in the independent transfer of a signal in the second communication band, thus enabling a low-loss signal transfer. The foregoing configuration also achieves high isolation between the signal path through which a signal in the third communication band is transferred and the signal paths through which signals in the first communication band and the second communication band are transferred in the independent transfer of a signal in the third communication band, thus enabling a low-loss signal transfer. The foregoing configuration also achieves high isolation between the signal path through which a signal in the first communication band is transferred and the signal path through which a signal in the fourth communication band is transferred in the independent transfer of a signal in the fourth communication band, thus enabling a low-loss signal transfer. The foregoing configuration also achieves high isolation between the signal paths through which signals in the first communication band and the second communication band are transferred and the signal path through which a signal in the third communication band is transferred in the simultaneous transfer of a signal in the first communication band and a signal in the second communication band, thus enabling a low-loss signal transfer. The foregoing configuration also achieves high isolation between the signal paths through which signals in the third communication band and the fourth communication band are transferred and the signal path through which a signal in the first communication band is transferred in the simultaneous transfer of a signal in the third communication band and a signal in the fourth communication band, thus enabling a low-loss signal transfer.

In radio frequency module 1B according to Embodiment 3 and radio frequency module 1C according to Embodiment 4, filters 11, 12, 21, and 22 may be disposed on the same board or inside of the same package. Also, radio frequency circuits 10 and 20B may be disposed on the same board or inside of the same package.

This configuration achieves the downsizing of radio frequency modules 1B and 1C.

Alternatively, in radio frequency module 1B according to Embodiment 3 and radio frequency module 1C according to Embodiment 4, filters 11 and 12 may be disposed on a different board or inside of a different package from a board or a package on which or inside of which filters 21 and 22 are disposed. Also, radio frequency circuits 10 and 20B may be disposed on different boards or inside of different packages.

This configuration further enhances the isolation between the signal paths of the first communication band and the second communication band and the signal paths of the third communication band and the fourth communication band.

In radio frequency module 1B according to Embodiment 3 and radio frequency module 1C according to Embodiment 4, for example, the first frequency range may include one of 3300 MHz to 4200 MHz and 3300 MHz to 3800 MHz, the second frequency range may include one of 5150 MHz to 5850 MHz and 5150 MHz to 7125 MHz, the third frequency range may include 4400 MHz to 5000 MHz, and the fourth frequency range may include 1700 MHz to 2700 MHz. In this case, for example, n77 or n78 of 5G-NR is applied to the first communication band, WLAN or NR-U (5.15 GHz to 7.125 GHz band) is applied to the second communication band, n79 or n78 of 5G-NR is applied to the third communication band, and one of n1 (transmission band: 1920 MHz to 1980 MHz, reception band: 2110 MHz to 2170 MHz), n3 (transmission band: 1710 MHz to 1785 MHz, reception band: 1805 MHz to 1880 MHz), and n41 (2496 MHz to 2690 MHz) of 5G-NR is applied to the fourth communication band.

With this configuration, in the simultaneous transfer of signals in the fourth communication band (n41 of 5G-NR) and the second communication band (WLAN), for example, the frequency range of WLAN (5.15 GHz to 7.125 GHz band) includes the frequency (5200 MHz) that is the second harmonic of a transmission signal in n41 of 5G-NR (e.g., the center frequency of 2600 MHz). In view of this, in radio frequency module 1B according to Embodiment 3, two antennas 2A and 2B enable isolation between filter 12 that passes a signal in the second communication band and filter 22 that passes a signal in the fourth communication band. This configuration is thus capable of preventing the harmonic that is the second harmonic of a transmission signal in n41 of 5G-NR from entering a signal path in which filter 22 is disposed. This configuration thus prevents the degradation in the signal quality of a transmission signal in WLAN, and also attenuates the lowering of the receiving sensitivity of WLAN.

Also, in the simultaneous transfer of signals in the fourth communication band (n1 of 5G-NR) and the first communication band (n77 of 5G-NR), for example, the frequency range of n77 of 5G-NR (3300 MHz to 4200 MHz) includes the frequency (3900 MHz) that is the second harmonic of a transmission signal in n1 of 5G-NR (e.g., the center frequency of 1950 MHz). In view of this, in radio frequency module 1B according to Embodiment 3, two antennas 2A and 2B enable isolation between filter 11 that passes a signal in the first communication band and filter 22 that passes a signal in the fourth communication band. This configuration is thus capable of preventing the harmonic that is the second harmonic of a transmission signal in n1 of 5G-NR from entering a signal path in which filter 11 is disposed. This configuration thus prevents the degradation in the signal quality of a transmission signal in n77 of 5G-NR, and also attenuates the lowering of the receiving sensitivity of n77 of 5G-NR.

Also, for example, in the simultaneous transfer of signals in the second communication band (WLAN) and the third communication band (n79 of 5G-NR), for example, the frequency range of WLAN (5150 MHz to 7125 MHz band) includes the third-order intermodulation distortion (2f2-f1) of a transmission signal in n79 of 5G-NR (e.g., the center frequency of f1 MHz) and a transmission signal in WLAN (e.g., the center frequency of f2 MHz). In view of this, in radio frequency module 1B according to Embodiment 3, two antennas 2A and 2B enable isolation between filter 12 that passes a signal in the second communication band and filter 21 that passes a signal in the third communication band. This configuration is thus capable of preventing the foregoing third-order intermodulation distortion from entering a signal path in which filter 12 is disposed. This configuration thus prevents the degradation in the signal quality of a transmission signal in WLAN, and also attenuates the lowering of the receiving sensitivity of WLAN.

Also, for example, in the simultaneous transfer of signals in the first communication band (n77 of 5G-NR) and the fourth communication band (n41 of 5G-NR), for example, the frequency range of n77 of 5G-NR (3300 MHz to 4200 MHz band) includes the third-order intermodulation distortion (2f2-f1) of a transmission signal in n77 of 5G-NR (e.g., the center frequency of f2 MHz) and a transmission signal in n41 of 5G-NR (e.g., the center frequency of f1 MHz). In view of this, in radio frequency module 1B according to Embodiment 3, two antennas 2A and 2B enable isolation between filter 11 that passes a signal in the first communication band and filter 22 that passes a signal in the fourth communication band. This configuration is thus capable of preventing the foregoing third-order intermodulation distortion from entering a signal path in which filter 11 is disposed. This configuration thus prevents the degradation in the signal quality of a transmission signal in n77 of 5G-NR, and also attenuates the lowering of the receiving sensitivity of n77 of 5G-NR.

In radio frequency module 1B according to Embodiment 3 and radio frequency module 1C according to Embodiment 4, for example, the first frequency range may be 4400 MHz to 5000 MHz, the second frequency range may be 5925 MHz to 7125 MHz, the third frequency range may be 5150 MHz to 5850 MHz, and the fourth frequency range may be 3300 MHz to 4200 MHz or 3300 MHz to 3800 MHz. In this case, for example, n79 of 5G-NR is applied to the first communication band, WLAN 6 GHz band (5935 MHz to 7125 MHz) or NR-U is applied to the second communication band, WLAN 5 GHz band (5150 MHz to 5725 MHz) or NR-U is applied to the third communication band, and n77 or n78 of 5G-NR is applied to the fourth communication band.

Note that WLAN 5 GHz band and WLAN 6 GHz band are compliant with IEEE 802.11, which is a wireless LAN standard.

With this configuration, in the simultaneous transfer of signals in the second communication band (WLAN 6 GHz band) and the fourth communication band (n78 of 5G-NR), for example, the frequency range of WLAN 6 GHz band (5935 MHz to 7125 MHz) includes the frequency (6600 MHz) that is the second harmonic of a transmission signal in n78 of 5G-NR (e.g., the center frequency of 3300 MHz). In view of this, in radio frequency module 1B according to Embodiment 3, two antennas 2A and 2B enable isolation between filter 12 that passes a signal in the second communication band and filter 22 that passes a signal in the fourth communication band. This configuration is thus capable of preventing the harmonic that is the second harmonic of a transmission signal in n78 of 5G-NR from entering a signal path in which filter 12 is disposed. This configuration thus prevents the degradation in the signal quality of a transmission signal in WLAN 6 GHz band, and also attenuates the lowering of the receiving sensitivity of WLAN 6 GHz band.

Also, for example, in the simultaneous transfer of signals in the first communication band (n79 of 5G-NR) and the third communication band (WLAN 5 GHz band), for example, the frequency range of WLAN 5 GHz band (5150 MHz to 5725 MHz band) includes the third-order intermodulation distortion (2f2-f1) of a transmission signal in n79 of 5G-NR (e.g., the center frequency of f1 MHz) and a transmission signal in WLAN 5 GHz band (e.g., the center frequency of f2 MHz). In view of this, in radio frequency module 1B according to Embodiment 3, two antennas 2A and 2B enable isolation between filter 11 that passes a signal in the first communication band and filter 21 that passes a signal in the third communication band. This configuration is thus capable of preventing the foregoing third-order intermodulation distortion from entering a signal path in which filter 21 is disposed. This configuration thus prevents the degradation in the signal quality of a transmission signal in WLAN 5 GHz band, and also attenuates the lowering of the receiving sensitivity of WLAN 5 GHz band.

Embodiment 5

While radio frequency module 1C according to Embodiment 4 has the circuit configuration for transferring signals in the first through fourth communication bands, radio frequency module 1D according to the present embodiment has a configuration that further includes a circuit for transferring signals in a fifth communication band.

Figure 9:
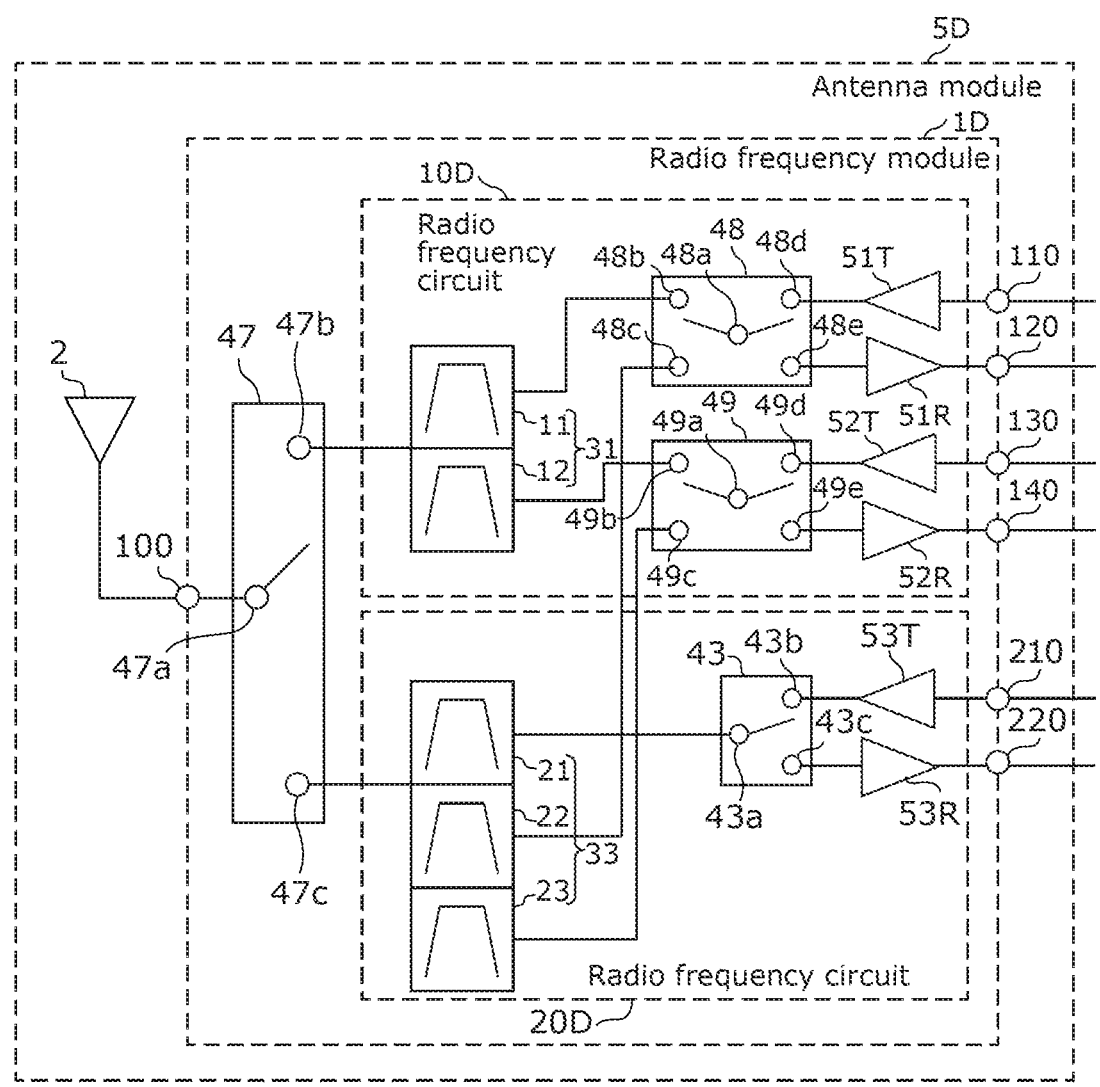
FIG. 9 is a diagram showing the circuit configurations of a radio frequency module and an antenna module according to Embodiment 5.

FIG. 9 is a diagram showing the circuit configurations of radio frequency module 1D and antenna module 5D according to Embodiment 5.

Antenna module 5D includes antenna 2 and radio frequency module 1D. Antenna module 5D according to the present embodiment is different from antenna module 5C according to Embodiment 4 in that radio frequency circuit 20D further includes filter 23 and in the connection of radio frequency circuits 10D and 20D. The following omits the descriptions of the same points as those of antenna module 5C and radio frequency module 1C according to Embodiment 4 and focuses on the differences to describe antenna module 5D and radio frequency module 1D according to the present embodiment.

Antenna 2 is connected to switch 47 of radio frequency module 1D. Antenna 2 transmits a radio frequency signal output from radio frequency circuit 10D or 20D. Antenna 2 also receives a radio frequency signal from outside, and outputs the received radio frequency signal to radio frequency circuit 10D or 20D.

As shown in FIG. 9, radio frequency module 1D includes antenna connection terminal 100, radio frequency circuits 10D and 20D, and switch 47.

As shown in FIG. 9, one end of filter 11 and one end of filter 12 are both connected to selection terminal 47b, and one end of filter 21, one end of filter 22, and one end of filter 23 are all connected to selection terminal 47c. Filters 11 and 12 are included in multiplexer 31, and filters 21, 22, and 23 are included in multiplexer 33.

Radio frequency circuit 10D includes filters 11 and 12, power amplifiers 51T and 52T, low-noise amplifiers 51R and 52R, and switches 48 and 49. Radio frequency circuit 20D includes filters 21, 22, and 23, power amplifier 53T, low-noise amplifier 53R, and switch 43.

Filter 23, which is an exemplary fifth filter, is connected to selection terminal 47c. Filter 23 is a radio frequency filter having a passband which is a fifth frequency range that includes the fifth communication band.

Radio frequency module 1D and antenna module 5D with the above configurations enable: (1) an independent transfer of a signal in the first communication band; (2) an independent transfer of a signal in the second communication band; (3) an independent transfer of a signal in the third communication band; (4) an independent transfer of a signal in the fourth communication band; (5) an independent transfer of a signal in the fifth communication band; (6) a simultaneous transfer of a signal in the first communication band and a signal in the second communication band; (7) a simultaneous transfer of a signal in the third communication band and a signal in the fourth communication band; (8) a simultaneous transfer of a signal in the third communication band and a signal in the fifth communication band; (9) a simultaneous transfer of a signal in the fourth communication band and a signal in the fifth communication band; and (10) a simultaneous transfer of a signal in the third communication band, a signal in the fourth communication band, and a signal in the fifth communication band.

Figure 10:
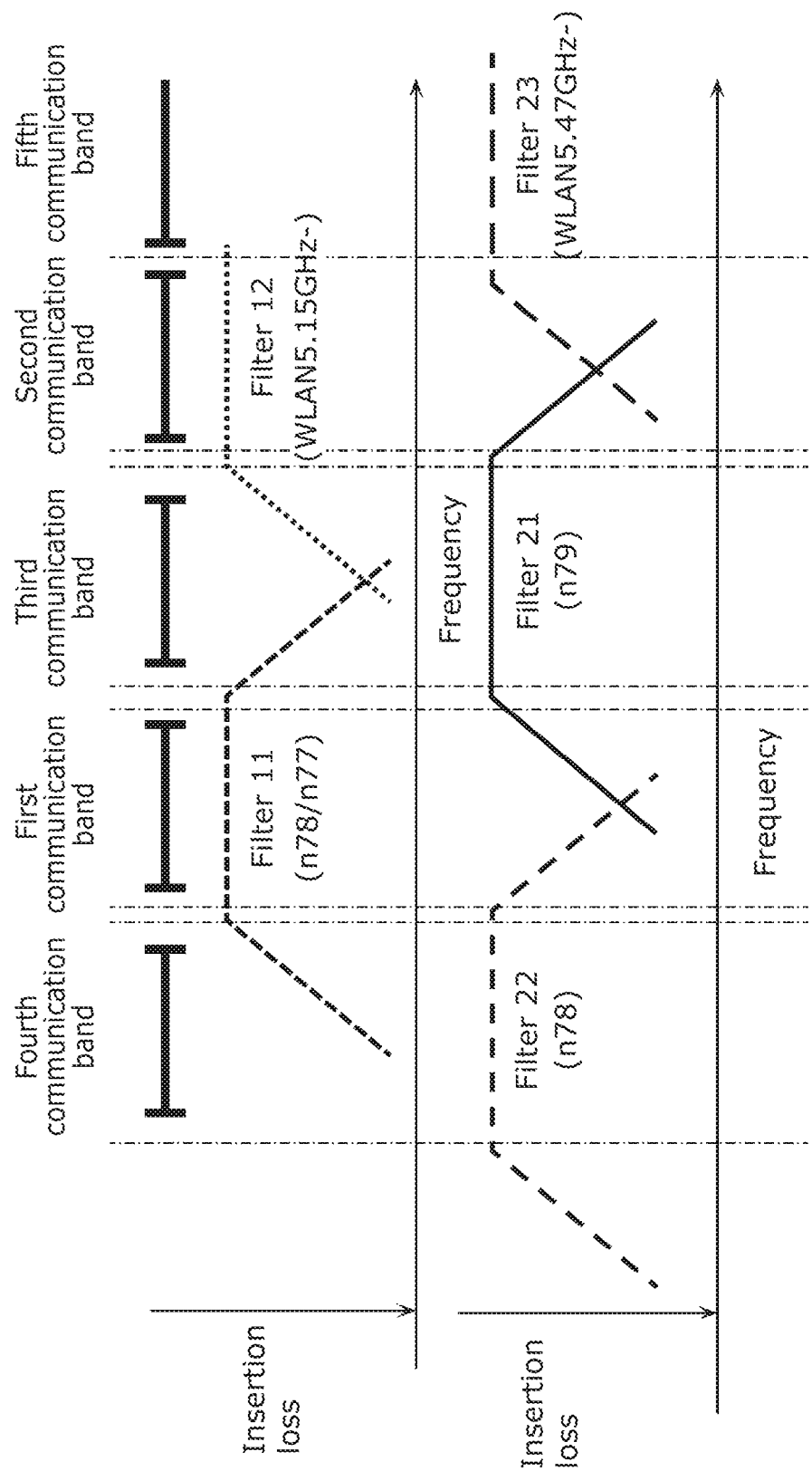
FIG. 10 is a diagram showing a relationship of the frequencies of the passbands of filters included in the radio frequency module according to Embodiment 5.

FIG. 10 is a diagram showing a relationship of the frequencies of the passbands of the filters included in radio frequency module 1D according to Embodiment 5. The drawing shows the relationship of the frequencies of the first communication band, second communication band, third communication band, fourth communication band, and fifth communication band, and filters 11, 12, 21, 22, and 23. In the present embodiment, the fourth communication band, first communication band, third communication band, second communication band, and fifth communication band are located in the stated order from the lower frequency side. Accordingly, the fourth frequency range that includes the fourth communication band, the first frequency range that includes the first communication band, the third frequency range that includes the third communication band, the second frequency range that includes the second communication band, and the fifth frequency range that includes the fifth communication band are located in the stated order from the lower frequency side. Stated differently, the third frequency range is located between the first frequency range and the second frequency range. Note that the third frequency range may overlap the first frequency range and the second frequency range; at least part of the third frequency range is simply required to be located between the first frequency range and the second frequency range. Also, the fourth frequency range is lower than the first frequency range. Note that the fourth frequency range may overlap the first frequency range. Also, the fifth frequency range is higher than the second frequency range. Note that the fifth frequency range may overlap the second frequency range. Accordingly, at least part of the passband of filter 21 is located between the passband of filter 11 and the passband of filter 12. Also, the passband of filter 22 is lower than the passband of filter 11. Also, the passband of filter 23 is higher than the passband of filter 12.

In radio frequency module 1D according to the present embodiment, filters 11 and 12 are connected to selection terminal 47b of switch 47, and filters 21, 22, and 23 are connected to selection terminal 47c of switch 47. Stated differently, filter 11 and filter 21 are not simultaneously connected because of the exclusive connection by switch 47. This configuration thus achieves high isolation between filter 11 and filter 21. Also, in this configuration, filter 12 and filter 21 are not simultaneously connected because of the exclusive connection by switch 47. This configuration thus achieves high isolation between filter 12 and filter 21. In this configuration, filter 11 and filter 22 are not simultaneously connected because of the exclusive connection by switch 47. This configuration thus achieves high isolation between filter 11 and filter 22. Also, in this configuration, filter 12 and filter 22 are not simultaneously connected because of the exclusive connection by switch 47. This configuration thus achieves high isolation between filter 12 and filter 22. In this configuration, filter 11 and filter 23 are not simultaneously connected because of the exclusive connection by switch 47. This configuration thus achieves high isolation between filter 11 and filter 23. Also, in this configuration, filter 12 and filter 23 are not simultaneously connected because of the exclusive connection by switch 47. This configuration thus achieves high isolation between filter 12 and filter 23.

The foregoing configuration also achieves high isolation between a signal path through which a signal in the fifth communication band is transferred and the signal path through which a signal in the first communication band is transferred in the independent transfer of a signal in the fifth communication band, thus enabling a low-loss signal transfer. The foregoing configuration also achieves high isolation between the signal paths through which signals in the third communication band, the fourth communication band, and the fifth communication band are transferred and the signal path through which a signal in the first communication band is transferred in the simultaneous transfer of a signal in the third communication band, a signal in the fourth communication band, and a signal in the fifth communication band, thus enabling a low-loss signal transfer.

In radio frequency module 1D according to Embodiment 5, for example, n77 or n78 of 5G-NR is applied to the first communication band, WLAN (5150 MHz or greater) is applied to the second communication band, n79 of 5G-NR is applied to the third communication band, n78 of 5G-NR is applied to the fourth communication band, and WLAN (5470 MHz or greater) is applied to the fifth communication band.

The following describes circuit components other than the filters included in radio frequency circuits 10D and 20D.

Power amplifier 51T is a transmission amplifier that amplifies a transmission signal in the first frequency range that includes the first communication band and a transmission signal in the fourth frequency range that includes the fourth communication band. The input terminal of power amplifier 51T is connected to transmission input terminal 110. Low-noise amplifier 51R is a reception amplifier that amplifies a reception signal in the first frequency range that includes the first communication band and a reception signal in the fourth frequency range that includes the fourth communication band. The output terminal of low-noise amplifier 51R is connected to reception output terminal 120.

Power amplifier 53T is a transmission amplifier that amplifies a transmission signal in the third frequency range that includes the third communication band. The input terminal of power amplifier 53T is connected to transmission input terminal 210. Low-noise amplifier 53R is a reception amplifier that amplifies a reception signal in the third frequency range that includes the third communication band. The output terminal of low-noise amplifier 53R is connected to reception output terminal 220.

Switch 43 includes common terminal 43a, and selection terminals 43b and 43c. Switch 43 exclusively switches between connecting common terminal 43a and selection terminal 43b and connecting common terminal 43a and selection terminal 43c. Common terminal 43a is connected to the other end of filter 21, selection terminal 43b to the output terminal of power amplifier 53T, and selection terminal 43c to the input terminal of low-noise amplifier 53R. Switch 43 performs the switching operation to enable radio frequency circuit 20D to transfer a transmission signal in the third communication band and a reception signal in the third communication band in different time slots.

Switch 48, which is an example of the second switch, includes common terminal 48a, selection terminal 48b (third selection terminal), selection terminal 48c (fourth selection terminal), selection terminal 48d (fifth selection terminal), and selection terminal 48e (fifth selection terminal). Selection terminal 48b is connected to filter 11, selection terminal 48c to filter 22, selection terminal 48d to the output terminal of power amplifier 51T, and selection terminal 48e to the input terminal of low-noise amplifier 51R. Switch 48 switches between connecting common terminal 48a and selection terminal 48b and connecting common terminal 48a and selection terminal 48c, and switches between connecting common terminal 48a and selection terminal 48d and connecting common terminal 48a and selection terminal

48*e*. Having this connection structure, switch 48 switches between connecting filter 11 and power amplifier 51T and connecting filter 22 and power amplifier 51T, and also switches between connecting filter 11 and low-noise amplifier 51R and connecting filter 22 and low-noise amplifier 51R. Switch 48 is, for example, a switch circuit that includes a single pole double throw (SPDT) sub-switch including common terminal 48*a*, and selection terminals 48*b* and 48*c*, and an SPDT sub-switch including common terminal 48*a*, and selection terminals 48*d* and 48*e*, where common terminals 48*a* of these two sub-switches are connected.

Switch 49 includes common terminal 49*a*, and selection terminals 49*b*, 49*c*, 49*d*, and 49*e*. Selection terminal 49*b* is connected to filter 12, selection terminal 49*c* to filter 23, selection terminal 49*d* to the output terminal of power amplifier 52T, and selection terminal 49*e* to the input terminal of low-noise amplifier 52R. Switch 49 switches between connecting common terminal 49*a* and selection terminal 49*b* and connecting common terminal 49*a* and selection terminal 49*c*, and switches between connecting common terminal 49*a* and selection terminal 49*d* and connecting common terminal 49*a* and selection terminal 49*e*. Having this connection structure, switch 49 exclusively switches between connecting filter 12 and power amplifier 52T and connecting filter 23 and power amplifier 52T, and also exclusively switches between connecting filter 12 and low-noise amplifier 54R and connecting filter 23 and low-noise amplifier 54R. Switch 49 is, for example, a switch circuit that includes an SPDT sub-switch including common terminal 49*a*, and selection terminals 49*b* and 49*c*, and an SPDT sub-switch including common terminal 49*a*, and selection terminals 49*d* and 49*e*, where common terminals 49*a* of these two sub-switches are connected.

Figure 11A:
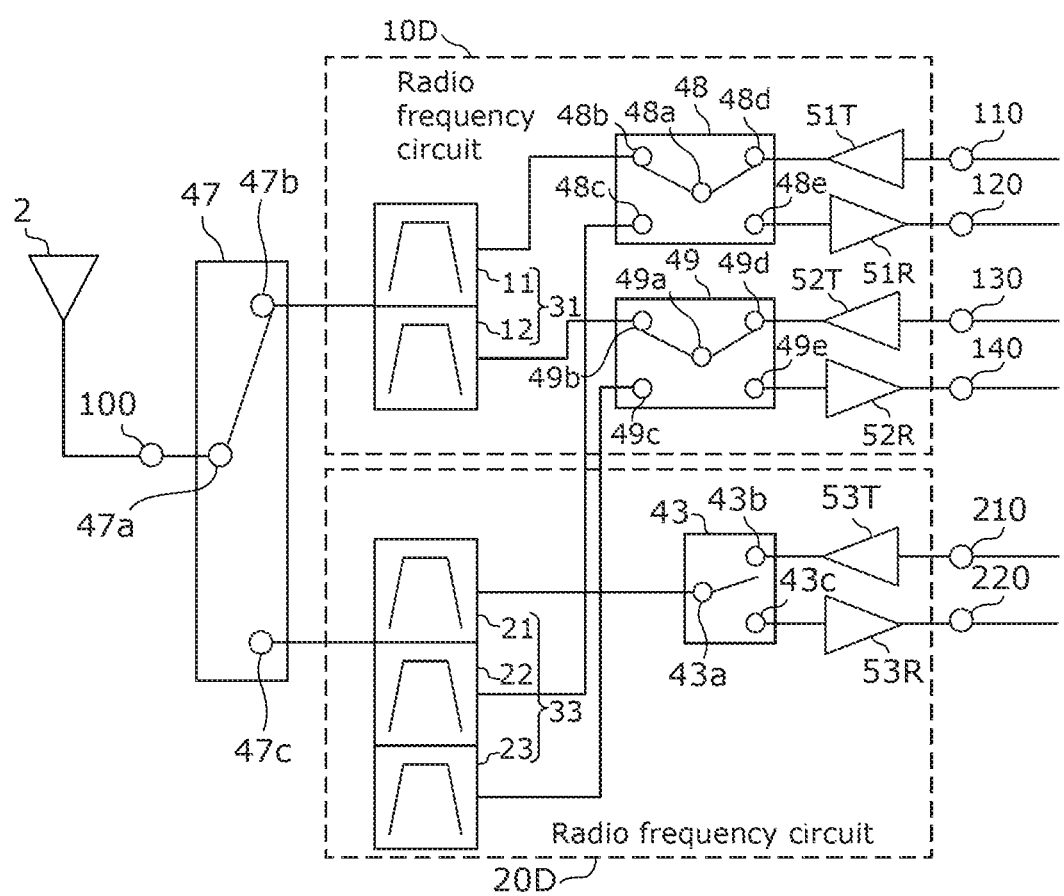
FIG. 11A is a diagram showing the circuit configuration of the radio frequency module according to Embodiment 5 in a first connection status.

FIG. 11A is a diagram showing the circuit configuration of radio frequency module 1D according to Embodiment 5 in a first connection status. As shown FIG. 11A, under a condition that common terminal 47*a* and selection terminal 47*b* are connected in switch 47, one of the following operations is performed: (1) an independent transfer of a signal in the first communication band; (2) an independent transfer of a signal in the second communication band; and (6) a simultaneous transfer of a signal in the first communication band and a signal in the second communication band. For operation (1), common terminal 48*a* and selection terminal 48*b* are connected. For operation (2), common terminal 49*a* and selection terminal 49*b* are connected. For operation (6), common terminal 48*a* and selection terminal 48*b* are connected, and common terminal 49*a* and selection terminal 49*b* are connected.

When in the first connection status described above, for example, radio frequency module 1D is capable of simultaneously transferring a radio frequency signal in n77 or n78 of 5G-NR and a radio frequency signal in WLAN (5150 MHz or greater) by use of multiplexer 31, under a condition that n79 of 5G-NR is not in use. Here, n78 of 5G-NR, which is the fourth communication band, is also usable.

Figure 11B:
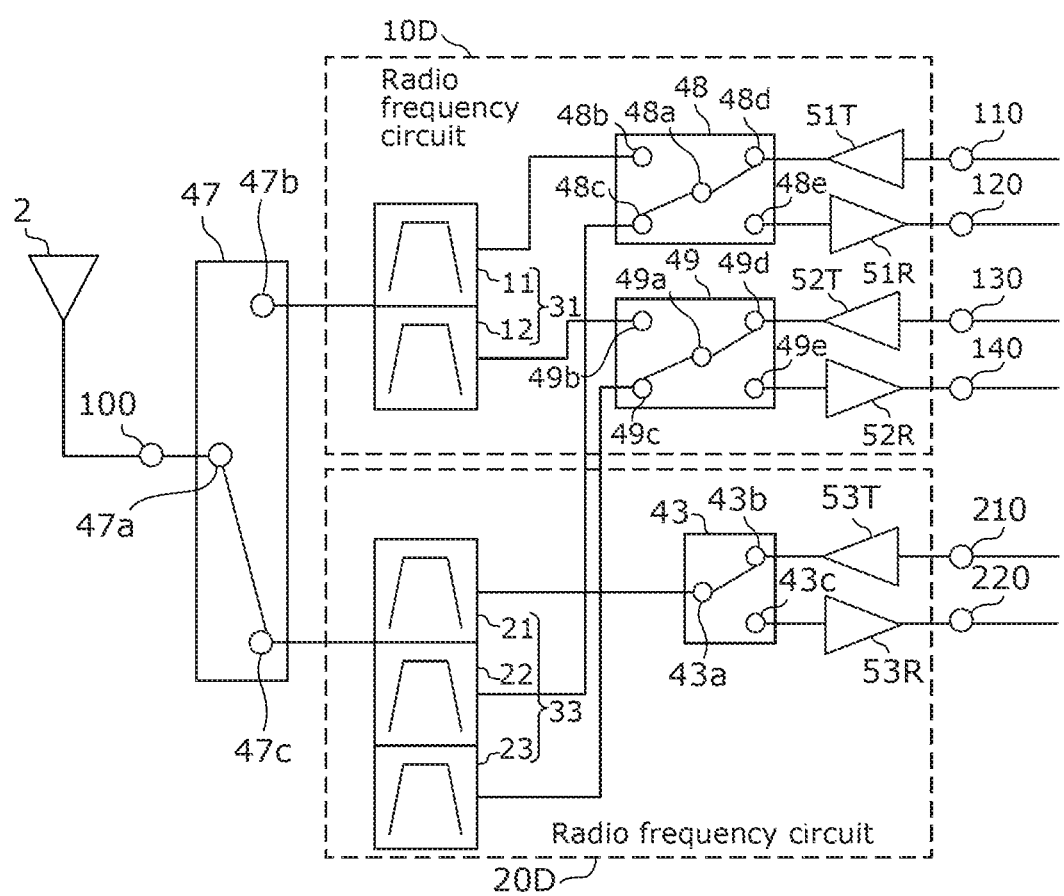
FIG. 11B is a diagram showing the circuit configuration of the radio frequency module according to Embodiment 5 in a second connection status.

FIG. 11B is a diagram showing the circuit configuration of radio frequency module 1D according to Embodiment 5 in a second connection status. As shown FIG. 11B, when common terminal 47*a* and selection terminal 47*c* are connected in switch 47, one of the following operations is performed: (3) an independent transfer of a signal in the third communication band; (4) an independent transfer of a signal in the fourth communication band; (5) an independent transfer of a signal in the fifth communication band; (7) a simultaneous transfer of a signal in the third communication band and a signal in the fourth communication band; (8) a simultaneous transfer of a signal in the third communication band and a signal in the fifth communication band; (9) a simultaneous transfer of a signal in the fourth communication band and a signal in the fifth communication band; or (10) a simultaneous transfer of a signal in the third communication band, a signal in the fourth communication band, and a signal in the fifth communication band. For operations (4) and (7), common terminal 48*a* and selection terminal 48*c* are connected. For operations (5) and (8), common terminal 49*a* and selection terminal 49*c* are connected. For operations (9) and (10), common terminal 48*a* and selection terminal 48*c* are connected, and common terminal 49*a* and selection terminal 49*c* are connected.

When in the second connection status described above, for example, radio frequency module 1D is capable of simultaneously transferring a radio frequency signal in n79 of 5G-NR, a radio frequency signal in n78 of 5G-NR, and a radio frequency signal in WLAN (5470 MHz or greater) by use of multiplexer 33, under a condition that n79 of 5G-NR is in use.

Note that filters 21, 22, and 23 included in multiplexer 33 may each be a single-chip LC filter. Also, multiplexer 33 may be a single-chip LC triplexer. Also, multiplexer 33 may include a single-chip LC diplexer and a single-chip LC filter.

Figure 12:
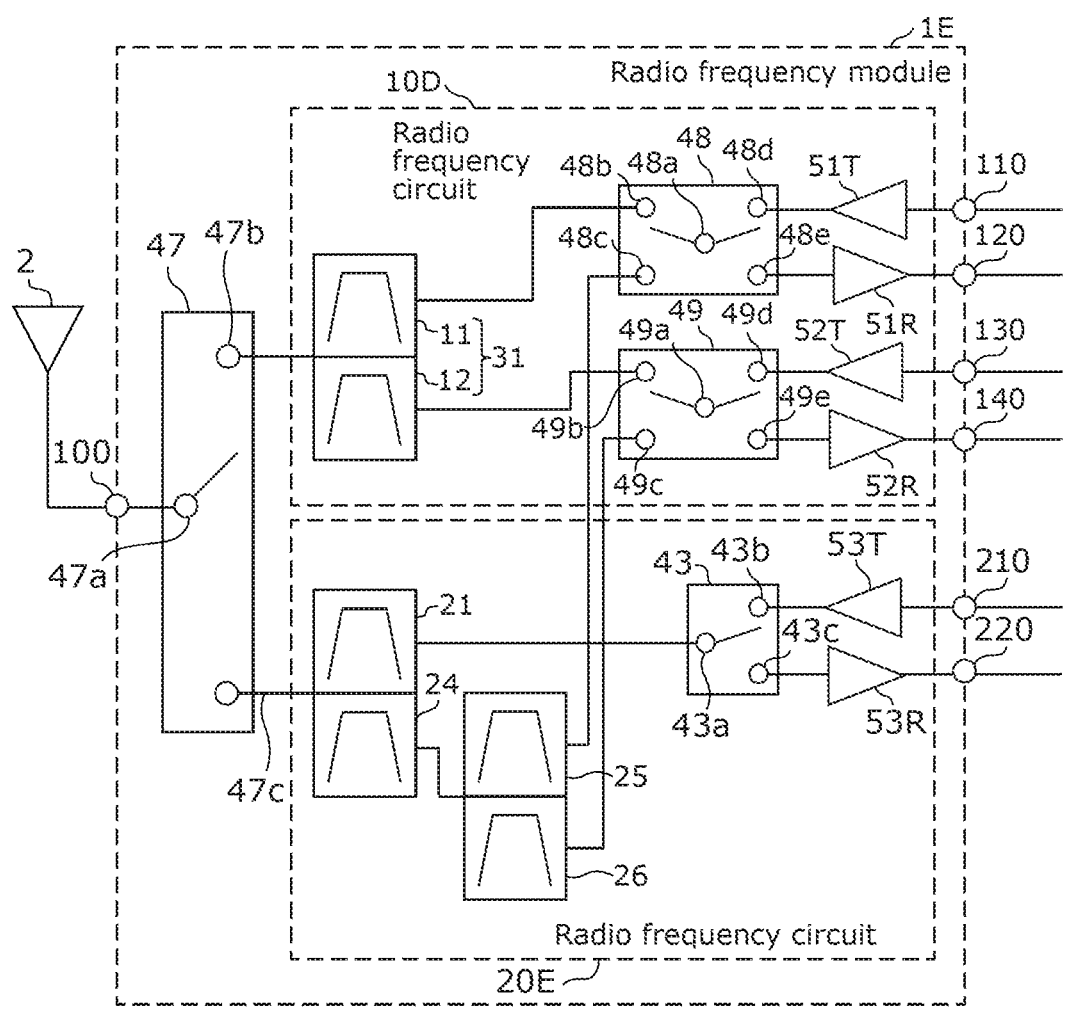
FIG. 12 is a diagram showing the circuit configuration of a radio frequency module according to a variation of Embodiment 5.

Alternatively, multiplexer 33 may have a configuration as shown, for example, in FIG. 12.

FIG. 12 is a diagram showing the circuit configuration of radio frequency module 1E according to a variation of Embodiment 5. As shown in FIG. 12, radio frequency module 1E according to the present variation may include a first diplexer including filters 21 and 24, and a second diplexer including filters 25 and 26, instead of multiplexer 33 included in radio frequency module 1D. One end of filter 21 and one end of filter 24 are connected to selection terminal 47*c*, the other end of filter 24 is connected to one end of filter 25 and one end of filter 26, the other end of filter 25 is connected to selection terminal 48*c*, and the other end of filter 26 is connected to selection terminal 49*c*.

Filter 21 is a filter having a passband which is the third frequency range that includes the third communication band. Filter 24 is a filter having passbands which are the fourth frequency range that includes the fourth communication band and the fifth frequency range that includes the fifth communication band. Also, Filter 25 is a filter having a passband which is the fourth frequency range that includes the fourth communication band, and filter 26 is a filter having a passband which is the fifth frequency range that includes the fifth communication band.

Note that radio frequency module 1E according to the variation of Embodiment 5 that eliminates switch 47 may also be included in the present disclosure. Stated differently, the radio frequency module according to the present disclosure may include: antenna connection terminal 100; antenna connection terminal 200 different from antenna connection terminal 100; filter 11 having a passband which is the first frequency range that includes the first communication band for TDD; filter 12 having a passband which is the second frequency range that includes the second communication band for TDD; filter 21 having a passband which is the third frequency range that includes the third communication band for TDD; filter 22 having a passband which is the fourth frequency range that includes the fourth communication band for TDD; filter 23 having a passband which is the fifth frequency range that includes the fifth communication band for TDD. Here, the fourth frequency range may be lower than the first frequency range, the second frequency range, and the third frequency range. The fifth frequency range may be higher than the first frequency range, the second frequency range, the third frequency range, and the fourth frequency range. Filters 11 and 12 may be connected to antenna connection terminal 100, and filters 21, 22, and 23 may be connected to antenna connection terminal 200.

This configuration, in which filters 11 and 21 are not connected to the same antenna connection terminal, achieves high isolation between filters 11 and 21. Also, this configuration, in which filters 12 and 21 are not connected to the same antenna connection terminal, achieves high isolation between filters 12 and 21. Also, this configuration, in which filters 11 and 22 are not connected to the same antenna connection terminal, achieves high isolation between filters 11 and 22. Also, this configuration, in which filters 12 and 22 are not connected to the same antenna connection terminal, achieves high isolation between filters 12 and 22. Also, this configuration, in which filters 11 and 23 are not connected to the same antenna connection terminal, achieves high isolation between filters 11 and 23. Also, this configuration, in which filters 12 and 23 are not connected to the same antenna connection terminal, achieves high isolation between filters 12 and 23.

As described above, radio frequency modules 1 and 1B each include: antenna connection terminal 100; antenna connection terminal 200 different from antenna connection terminal 100; filter 11 having a passband which is a first frequency range that includes a first communication band for TDD; filter 12 having a passband which is a second frequency range that includes a second communication band for TDD; and filter 21 having a passband which is a third frequency range that includes a third communication band for TDD. Here, at least part of the third frequency range is located between the first frequency range and the second frequency range, and filters 11 and 12 are both connected to one of antenna connection terminals 100 and 200, and filter 21 is connected to a remaining one of antenna connection terminals 100 and 200.

This configuration, in which filter 11 and filter 21 are connected to different antennas, achieves high isolation between a signal in the first communication band that passes through filter 11 and a signal in the third communication band that passes through filter 21. Also, this configuration, in which filter 12 and filter 21 are connected to different antennas, achieves high isolation between a signal in the second communication band that passes through filter 12 and a signal in the third communication band that passes through filter 21.

The foregoing configuration achieves high isolation between two signals to be simultaneously transferred, that is: a signal in the first communication band and a signal in the third communication band; or a signal in the second communication band and a signal in the third communication band. This configuration thus enables low-loss signal transfer. The foregoing configuration also enables low-loss signal transfer in the independent transfer of a signal in the first communication band, in the independent transfer of a signal in the second communication band, and in the independent transfer of a signal in the third communication band, and in the simultaneous transfer of a signal in the first communication band and a signal in the second communication band.

The radio frequency module according to a variation of Embodiment 1 may further include: switch 45 that includes common terminals 45a and 45b and selection terminals 45c and 45d, and connects common terminal 45a exclusively to selection terminal 45c or 45d, and connects common terminal 45b exclusively to selection terminal 45c or 45d. Here, common terminal 45a may be connected to the one of antenna connection terminals 100 and 200, common terminal 45b may be connected to the remaining one of antenna connection terminals 100 and 200, selection terminal 45c may be connected to filters 11 and 12, selection terminal 45d may be connected to filter 21, and filters 11 and 12 may be both connected to one of antenna connection terminals 100 and 200 via selection terminal 45c, and filter 21 may be connected to a remaining one of antenna connection terminals 100 and 200 via selection terminal 45d.

This configuration, in which filter 11 and filter 21 are connected to different antennas, achieves high isolation between a signal in the first communication band that passes through filter 11 and a signal in the third communication band that passes through filter 21. Also, this configuration, in which filter 12 and filter 21 are connected to different antennas, achieves high isolation between a signal in the second communication band that passes through filter 12 and a signal in the third communication band that passes through filter 21.

Radio frequency module 1B according to Embodiment 3 may further include: filter 22 having a passband which is a fourth frequency range that includes a fourth communication band, filter 22 being connected to the remaining one of antenna connection terminals 100 and 200. Here, the fourth frequency range may be lower or higher than the first frequency range, the second frequency range, and the third frequency range.

This configuration, in which filter 21 and filter 11 are connected to different antennas, achieves high isolation between a signal in the third communication band that passes through filter 21 and a signal in the first communication band that passes through filter 11. Also, this configuration, in which filter 21 and filter 12 are connected to different antennas, achieves high isolation between a signal in the third communication band that passes through filter 21 and a signal in the second communication band that passes through filter 12. Also, this configuration, in which filter 22 and filter 11 are connected to different antennas, achieves high isolation between a signal in the fourth communication band that passes through filter 22 and a signal in the first communication band that passes through filter 11. Also, this configuration, in which filter 22 and filter 12 are connected to different antennas, achieves high isolation between a signal in the fourth communication band that passes through filter 22 and a signal in the second communication band that passes through filter 12.

The foregoing configuration achieves high isolation between two signals to be simultaneous transferred, that is: a signal in the first communication band and a signal in the third communication band; a signal in the first communication band and a signal in the fourth communication band; a signal in the second communication band and a signal in the third communication band; or a signal in the second communication band and a signal in the fourth communication band. This configuration thus enables low-loss signal transfer. The foregoing configuration also enables low-loss signal transfer in the independent transfer of a signal in the first communication band, in the independent transfer of a signal in the second communication band, in the independent transfer of a signal in the third communication band, in the independent transfer of a signal in the fourth communication band, in the simultaneous transfer of a signal in the first communication band and a signal in the second communication band, and in the simultaneous transfer of a signal in the third communication band and a signal in the fourth communication band.

Also, each of radio frequency modules 1 and 1B may further include: antenna 2A connected to antenna connection terminal 100; and antenna 2B connected antenna connection terminal 200.

Also, radio frequency module 1A according to Embodiment 3 may further include: antenna connection terminal 100; switch 40 that includes selection terminals 40*b* and 40*c* and common terminal 40*a* that is connected to antenna connection terminal 100, and exclusively switches between connecting common terminal 40*a* and selection terminal 40*b* and connecting common terminal 40*a* and selection terminal 40*c*; filter 11 having a passband which is a first frequency range that includes a first communication band for TDD, filter 11 being connected to selection terminal 40*b*; filter 12 having a passband which is a second frequency range that includes a second communication band for TDD, filter 12 being connected to selection terminal 40*b*; and filter 21 having a passband which is a third frequency range that includes a third communication band for TDD, filter 21 being connected to selection terminal 40*c*. Here, at least part of the third frequency range may be located between the first frequency range and the second frequency range.

In this configuration, filter 11 and filter 21 are not simultaneously connected because of the exclusive connection by switch 40. This configuration thus achieves high isolation between filter 11 and filter 21. Also, in this configuration, filter 12 and filter are not simultaneously connected because of the exclusive connection by switch 40. This configuration thus achieves high isolation between filter 12 and filter 21.

The foregoing configuration thus enables low-loss signal transfer in the independent transfer of a signal in the first communication band, in the independent transfer of a signal in the second communication band, and in the independent transfer of a signal in the third communication band. The foregoing configuration also achieves high isolation between the signal paths through which signals in the first communication band and the second communication band are transferred and the signal path through which a signal in the third communication band is transferred in the simultaneous transfer of a signal in the first communication band and a signal in the second communication band, thus enabling a low-loss signal transfer.

Also, radio frequency module 1C according to Embodiment 4 may further include: filter 22 having a passband which is a fourth frequency range that includes a fourth communication band, filter 22 being connected to selection terminal 47*c*. Here, the fourth frequency range may be lower or higher than the first frequency range, the second frequency range, and the third frequency range.

In this configuration, filter 11 and filter 22 are not simultaneously connected because of the exclusive connection by switch 47. This configuration thus achieves high isolation between filter 11 and filter 22. Also, in this configuration, filter 12 and filter are not simultaneously connected because of the exclusive connection by switch 47. This configuration thus achieves high isolation between filter 12 and filter 22.

The foregoing configuration thus enables a low-loss signal transfer in the independent transfer of a signal in the first communication band, in the independent transfer of a signal in the second communication band, in the independent transfer of a signal in the third communication band, and in the independent transfer of a signal in the fourth communication band. The foregoing configuration also achieves high isolation between the signal paths through which signals in the third communication band and the fourth communication band are transferred and the signal path through which a signal in the first communication band is transferred in the simultaneous transfer of a signal in the third communication band and a signal in the fourth communication band, thus enabling a low-loss signal transfer.

Also, each of radio frequency modules 1A and 1C may further include: antenna 2 connected to antenna connection terminal 100.

Also, radio frequency module 1D according to Embodiment 5 may further include: filter 23 having a passband which is a fifth frequency range that includes a fifth communication band, filter 23 being connected to selection terminal 47*c*; power amplifier 51T that amplifies radio frequency signals in the first communication band and the fourth communication band; and switch 48 that includes selection terminal 48*b* connected to filter 11, selection terminal 48*c* connected to filter 22, and selection terminal 48*d* connected to power amplifier 51T, and exclusively switches between connecting selection terminal 48*d* and selection terminal 48*b* and connecting selection terminal 48*d* and selection terminal 48*c*. Here, the fourth frequency range may be lower than the first frequency range, the second frequency range, and the third frequency range, and the fifth frequency range may be higher than the first frequency range, the second frequency range, the third frequency range, and the fourth frequency range.

Here, filters 11, 12, and 21 may be disposed on the same board or inside of the same package.

This configuration achieves the downsizing of radio frequency modules 1, 1A, 1B, and 1C.

Here, filters 11 and 12 may be disposed on a different board or inside of a different package from a board or a package on which or inside of which filter 21 is disposed.

This configuration further enhances the isolation between the signal paths of the first communication band and the second communication band and the signal path of the third communication band.

Also, communication device 6 includes: one of radio frequency modules 1, 1A, 1B, and 1C; and RFIC 3 that processes a radio frequency signal transferred by such radio frequency module.

This configuration provides communication device 6 that enables low-loss transfer of signals in TDD communication bands.

Another Embodiment

The radio frequency module and the communication device according to the present disclosure have been described above using embodiments and variations thereof, but the present disclosure is not limited to the foregoing embodiments and variations. The present disclosure also includes: another embodiment achieved by freely combining structural elements in the foregoing embodiments and variations; variations achieved by making various modifications to the foregoing embodiments that can be conceived by those skilled in the art without departing from the essence of the present disclosure; and various devices that include the radio frequency module and the communication device according to the present disclosure.

In the multiplexer, front-end circuit, and communication device in the foregoing embodiments and variations, for example, a matching element such as an inductor and a capacitor, and a switch circuit may be connected between circuit elements. Note that the inductor may include a wiring inductor implemented as wiring that connects circuit elements.

Note that filters 11, 12, 21, and 22 according to the foregoing embodiments and variations are, for example, acoustic wave filters and LC filters having any filter structures. Here, an acoustic wave filter is a filter having an acoustic wave resonator. Also, an LC filter is defined as a filter having a passband which includes one or more inductors and one or more capacitors. Such LC filter may thus include an acoustic wave resonator for forming an attenuation pole that is present outside of the passband.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

The present disclosure is widely applicable for use in communication equipment, such as a mobile phone, as a multiplexer, a front-end circuit, and a communication device that can be applied in a multiband system that includes 5G-NR communication bands.

What is claimed is:

1. A radio frequency module, comprising:
a first antenna connection terminal;
a second antenna connection terminal different from the first antenna connection terminal;
a first filter having a passband of a first frequency range that includes a first communication band allocated as a communication band for Time Division Duplex (TDD);
a second filter having a passband of a second frequency range that includes a second communication band allocated as a communication band for TDD;
a third filter having a passband of a third frequency range that includes a third communication band allocated as a communication band for TDD;
a fourth filter having a passband of a fourth frequency range that includes a fourth communication band, the fourth filter being connected to the remaining one of the first antenna connection terminal or the second antenna connection terminal;
an amplifier configured to amplify radio frequency signals in one of the first communication band or the fourth communication band;
a first switch including a first common terminal, a second common terminal, a first selection terminal, and a second selection terminal, and configured to connect the first common terminal exclusively to the first selection terminal or the second selection terminal, and connect the second common terminal exclusively to the first selection terminal or the second selection terminal; and
a second switch including a third selection terminal connected to the first filter, a fourth selection terminal connected to the fourth filter, and a fifth selection terminal connected to the amplifier, and configured to exclusively switch between connecting the fifth selection terminal and the third selection terminal and connecting the fifth selection terminal and the fourth selection terminal,
wherein at least part of the third frequency range is located between the first frequency range and the second frequency range,
the fourth frequency range is lower than the first frequency range, the second frequency range, and the third frequency range,
the first common terminal is connected to the one of the first antenna connection terminal or the second antenna connection terminal,
the second common terminal is connected to the remaining one of the first antenna connection terminal or the second antenna connection terminal,
the first selection terminal is connected to the first filter and the second filter,
the second selection terminal is connected to the third filter, and
the first filter and the second filter are both connected to one of the first antenna connection terminal or the second antenna connection terminal via the first selection terminal, and the third filter is connected to a remaining one of the first antenna connection terminal or the second antenna connection terminal via the second selection terminal.

2. The radio frequency module according to claim 1, further comprising:
a first antenna connected to the first antenna connection terminal; and
a second antenna connected to the second antenna connection terminal, the second antenna being different from the first antenna.

3. The radio frequency module according to claim 1, wherein the first frequency range includes one of 3300 MHz to 4200 MHz or 3300 MHz to 3800 MHz,
the second frequency range includes one of 5150 MHz to 5850 MHz or 5150 MHz to 7125 MHz,
the third frequency range includes 4400 MHz to 5000 MHz,
the first communication band is n77 or n78 of Fifth Generation-New Radio (5G-NR),
the second communication band is Wireless Local Area Network (WLAN) or 5G-NR of 5 GHz or greater, and
the third communication band is n79 or n78 of 5G-NR.

4. The radio frequency module according to claim 1, further comprising:
a fifth filter having a passband of a fifth frequency range that includes a fifth communication band, the fifth filter being connected to the remaining one of the first antenna connection terminal or the second antenna connection terminal,
wherein the fifth frequency range is higher than the first frequency range, the second frequency range, the third frequency range, and the fourth frequency range.

5. The radio frequency module according to claim 1, wherein the fourth frequency range includes 1700 MHz to 2700 MHz, and
the fourth communication band is one of n1, n3, or n41 of 5GNR.

6. The radio frequency module according to claim 1, wherein the first frequency range includes 4400 MHz to 5000 MHz,
the second frequency range includes 5925 MHz to 7125 MHz,
the third frequency range includes 5150 MHz to 5850 MHz,
the fourth frequency range includes one of 3300 MHz to 4200 MHz or 3300 MHz to 3800 MHz,
the first communication band is n79 of 5G-NR,
the second communication band is WLAN 6 GHz band or 5G-NR of 5 GHz or greater,
the third communication band is WLAN 5 GHz band or 5G-NR of 5 GHz or greater, and
the fourth communication band is n77 or n78 of 5G-NR.

7. The radio frequency module according to claim 1, wherein the first frequency range includes 24.25 GHz to 27.50 GHz, the second frequency range includes one of 37.00 GHz to 40.00 GHz or 39.50 GHz to 43.50 GHz,
the third frequency range includes one of 26.50 GHz to 29.50 GHz or 27.50 GHz to 28.35 GHz,
the first communication band is n258 of 5G-NR,
the second communication band is n260 or n259 of 5G-NR, and
the third communication band is n257 or n261 of 5G-NR.

8. The radio frequency module according to claim 1, wherein the first frequency range includes one of 26.50 GHz to 29.50 GHz or 27.50 GHz to 28.35 GHz,
the second frequency range includes 39.50 GHz to 43.50 GHz,
the third frequency range includes 37.00 GHz to 40.00 GHz,
the fourth frequency range includes 24.25 GHz to 27.50 GHz,
the first communication band is n257 or n261 of 5G-NR,
the second communication band is n259 of 5G-NR,
the third communication band is n260 of 5G-NR, and
the fourth communication band is n258 of 5G-NR.

9. The radio frequency module according to claim 1, wherein the first filter, the second filter, and the third filter are disposed on a same board or inside of a same package.

10. The radio frequency module according to claim 1, wherein the first filter and the second filter are disposed on a different board or inside of a different package from a board or a package on which or inside of which the third filter is disposed.

11. A radio frequency module, comprising:
an antenna connection terminal;
a first switch including a first selection terminal, a second selection terminal, and a common terminal that is connected to the antenna connection terminal, the first switch configured to exclusively switch between connecting the common terminal and the first selection terminal and connecting the common terminal and the second selection terminal;
a first filter having a passband which is a first frequency range that includes a first communication band allocated as a communication band for TDD, the first filter being connected to the first selection terminal;
a second filter having a passband which is a second frequency range that includes a second communication band allocated as a communication band for TDD, the second filter being connected to the first selection terminal;
a third filter having a passband which is a third frequency range that includes a third communication band allocated as a communication band for TDD, the third filter being connected to the second selection terminal;
a fourth filter having a passband of a fourth frequency range that includes a fourth communication band, the fourth filter being connected to the second selection terminal;
an amplifier configured to amplify radio frequency signals in the first communication band and the fourth communication band; and
a second switch including a third selection terminal connected to the first filter, a fourth selection terminal connected to the fourth filter, and a fifth selection terminal connected to the amplifier, the second switch configured to exclusively switch between connecting the fifth selection terminal and the third selection terminal and connecting the fifth selection terminal and the fourth selection terminal,
wherein at least part of the third frequency range is located between the first frequency range and the second frequency range, and
the fourth frequency range is lower than the first frequency range, the second frequency range, and the third frequency range.

12. The radio frequency module according to claim 11, wherein the first frequency range includes one of 3300 MHz to 4200 MHz or 3300 MHz to 3800 MHz,
the second frequency range includes one of 5150 MHz to 5850 MHz or 5150 MHz to 7125 MHz,
the third frequency range includes 4400 MHz to 5000 MHz,
the first communication band is n77 or n78 of 5G-NR,
the second communication band is WLAN or 5G-NR of 5 GHz or greater, and
the third communication band is n79 or n78 of 5G-NR.

13. The radio frequency module according to claim 11, further comprising:
a fifth filter having a passband of a fifth frequency range that includes a fifth communication band, the fifth filter being connected to the second selection terminal,
wherein the fifth frequency range is higher than the first frequency range, the second frequency range, the third frequency range, and the fourth frequency range.

14. The radio frequency module according to claim 11, wherein the fourth frequency range includes 1700 MHz to 2700 MHz, and
the fourth communication band is one of n1, n3, or n41 of 5GNR.

15. The radio frequency module according to claim 11, wherein the first frequency range includes 4400 MHz to 5000 MHz,
the second frequency range includes 5925 MHz to 7125 MHz,
the third frequency range includes 5150 MHz to 5850 MHz,
the fourth frequency range includes one of 3300 MHz to 4200 MHz or 3300 MHz to 3800 MHz,
the first communication band is n79 of 5G-NR,
the second communication band is WLAN 6 GHz band or 5G-NR of 5 GHz or greater,
the third communication band is WLAN 5 GHz band or 5G-NR of 5 GHz or greater, and
the fourth communication band is n77 or n78 of 5G-NR.

16. The radio frequency module according to claim 11, wherein the first filter, the second filter, and the third filter are disposed on a same board or inside of a same package.

17. The radio frequency module according to claim 11, wherein the first filter and the second filter are disposed on a different board or inside of a different package from a board or a package on which or inside of which the third filter is disposed.

* * * * *

UNITED STATES PATENT AND TRADEMARK OFFICE
CERTIFICATE OF CORRECTION

PATENT NO. : 11,658,794 B2
APPLICATION NO. : 17/308190
DATED : May 23, 2023
INVENTOR(S) : Hirotsugu Mori It is certified that error appears in the above-identified patent and that said Letters Patent is hereby corrected as shown below:

In the Specification

Column 15, Line 56, "3.1" should be -- 3.2 --.

Column 18, Line 54, "filter are not" should be -- filter 21 are not --.

Column 29, Line 27, "filter are not" should be -- filter 21 are not --.

Column 29, Line 54, "filter are not" should be -- filter 22 are not --.

Signed and Sealed this
Thirtieth Day of January, 2024

Katherine Kelly Vidal
*Director of the United States Patent and Trademark Office*